(12) United States Patent
Yamada et al.

(10) Patent No.: US 9,229,830 B2
(45) Date of Patent: Jan. 5, 2016

(54) SEMICONDUCTOR INTEGRATED CIRCUIT DEVICE AND MICROCONTROLLER

(71) Applicant: Renesas Electronics Corporation, Kawasaki-shi, Kanagawa (JP)

(72) Inventors: Hiromichi Yamada, Tokyo (JP);
Tsutomu Yamada, Tokyo (JP);
Nobuyasu Kanekawa, Tokyo (JP);
Kesami Hagiwara, Kanagawa (JP);
Yuichi Ishiguro, Kanagawa (JP);
Takashi Yasumasu, Kanagawa (JP);
Kazuyoshi Fukuda, Kanagawa (JP);
Yoshiyuki Nakada, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 154 days.

(21) Appl. No.: 14/033,000

(22) Filed: Sep. 20, 2013

(65) Prior Publication Data

US 2014/0082427 A1 Mar. 20, 2014

(30) Foreign Application Priority Data

Sep. 20, 2012 (JP) .................................. 2012-206731

(51) Int. Cl.
*G06F 11/00* (2006.01)
*G06F 11/22* (2006.01)
*G06F 11/14* (2006.01)
*G06F 11/07* (2006.01)

(52) U.S. Cl.
CPC ............ *G06F 11/2215* (2013.01); *G06F 11/07* (2013.01); *G06F 11/141* (2013.01)

(58) Field of Classification Search
CPC ...... G06F 11/2215; G06F 11/07; G06F 11/14; G06F 11/1405; G06F 11/141; G06F 11/1497
USPC .............. 714/44, 10, 11, 17, 25, 37, 45, 47.1, 714/47.3
See application file for complete search history.

(56) References Cited

U.S. PATENT DOCUMENTS

| 6,625,749 | B1 * | 9/2003 | Quach ............................ 714/10 |
| 7,444,497 | B2 | 10/2008 | Reinhardt et al. |
| 2001/0034824 | A1 * | 10/2001 | Mukherjee et al. ........... 712/215 |
| 2002/0133745 | A1 * | 9/2002 | Okin ............................... 714/11 |
| 2005/0154944 | A1 * | 7/2005 | Reinhardt et al. ............ 714/718 |
| 2010/0169582 | A1 * | 7/2010 | Hinton et al. ................. 711/146 |
| 2011/0047364 | A1 | 2/2011 | Koju et al. |
| 2012/0072676 | A1 * | 3/2012 | Accapadi et al. ............. 711/147 |

FOREIGN PATENT DOCUMENTS

| JP | 08-171581 A | 7/1996 |
| JP | 4531060 B2 | 8/2010 |
| JP | 2011-044078 A | 3/2011 |

\* cited by examiner

*Primary Examiner* — Joseph D Manoskey
(74) *Attorney, Agent, or Firm* — Miles & Stockbridge P.C.

(57) ABSTRACT

To have a problem of occurrence of the same failure in failure detection of a microcontroller. A microcontroller has a CPU and a data access control circuit. The data access control circuit performs two types of accesses: an individual access in which a data access of the CPU is performed for each thread, and a shared access in which a data access of the CPU is performed by executing two threads. The data access control circuit detects a failure of the CPU by making a comparison between the command and the address, respectively, in the shared access generated by executing the two threads.

18 Claims, 16 Drawing Sheets

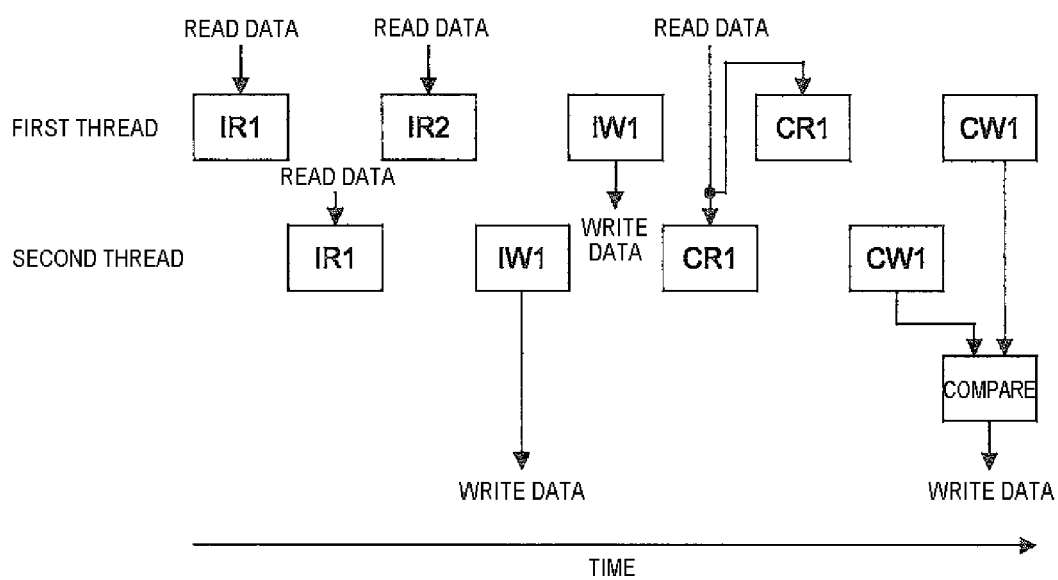

SEMICONDUCTOR INTEGRATED CIRCUIT DEVICE AND MICROCONTROLLER

CROSS-REFERENCE TO RELATED APPLICATION

The disclosure of Japanese Patent Application No. 2012-206731 filed on Sep. 20, 2012 including the specification, drawings and abstract is incorporated herein by reference in its entirety.

BACKGROUND

The present invention relates to a semiconductor integrated circuit device, and also relates to a technique capable of being applied to detection of a failure of a microcontroller, which is a computer for control.

A microcontroller is a device which is incorporated in equipment, such as household appliance, AV equipment, mobile telephone, automobile, and industrial machine and which performs control of each piece of equipment by performing processing in accordance with programs stored in a built-in memory, and the microcontroller is usually configured as a semiconductor integrated circuit.

In a part of equipment such as an automobile, high reliability is required for parts including the microcontroller because a failure of a control device may lead to an accident, and also the parts are designed so that the safety function is operated to prevent the equipment from reaching a dangerous state by detecting a failure when it occurs. It is necessary for the microcontroller not only to detect a failure of a sensor and actuator by diagnosing them, but also to detect a failure of the microcontroller itself.

Among a variety of methods for detecting a failure of a microcontroller, there is frequently used a method in which duplexed functional blocks (for example, CPU, which is a central operation unit (also called a central processing unit, central operation processing unit), hereinafter, the central operation unit is represented as CPU) having the same function are provided, and a failure of the functional block is detected by comparing output signals of each functional block. This detection method is called duplexing processing. The effectiveness of this method is based on the assumption that failures of the duplexed functional blocks occur independently and the same failure does not occur at the same time. In the case where the same failure has occurred in both the functional blocks at the same time, the erroneous outputs agree with each other, and thus it is not possible to detect the failure.

Japanese Patent Laid-Open No. 08-171581 (Patent Document 1) discloses a method for diversifying the design data of duplexed functional blocks, operation timings, and arrangement on the chip, in order to prevent occurrence of the same failure described above.

Furthermore, a method of using one or two CPUs to perform duplexing processing by two threads is disclosed in Japanese Patent No. 4531060 (Patent Document 2) and Japanese Patent Laid-Open No. 2011-44078 (Patent Document 3).

SUMMARY

With the method, disclosed in Patent Document 1, of duplexing the functional block and comparing output signals, it is necessary to add the functional block and a comparator circuit, and thus there is a problem in which the circuit area of the functional block is twice or more and the chip cost and power consumption are increased, and the method is not suitable for a semiconductor integrated circuit device such as a microcontroller. In the duplexing processing by two threads in the CPU disclosed in Patent Document 2, quite the same programs are executed, and thus there is a possibility that the same failure occurs. In the duplexing processing by two threads disclosed in Patent Document 3, different compile processing has been performed on the original programs, and thus the programs themselves are slightly different between the two threads. Because of this, in the case where the duplexing processing is performed between the two threads whose programs are slightly different, the result will be as follows. In the case where the processing to output the operation processing result to an external device of the CPU is compared between the two threads, if there is no failure, it can be considered that no error occurs in the comparison processing. However, in the case where the processing to store the temporary result in an internal memory in performing the data operation processing is compared between the two threads, even if there is no failure, there may be a possibility that an error occurs in the comparison processing. The reason is because it can be considered that the final output result of the programs on which different compile processing has been performed to the external device is the same, but that the operation processing on the way is not necessarily the same. Consequently, even if the duplexing processing is performed by two threads on the basis of the programs on which different compile processing has been performed, it is not possible to detect a failure in a simple manner.

The other problems and the new features will become clear from the description of the present specification and the accompanying drawings.

A semiconductor integrated circuit device according to an embodiment performs two types of accesses: an individual access in which the data access of the CPU is performed for each thread; and a shared access in which the data access of the CPU is performed by executing two threads.

According to the embodiment, it is possible to reduce the occurrence of the same failure based on the execution of the two threads by the CPU.

BRIEF DESCRIPTION OF THE DRAWINGS

FIG. 7 is a data access timing chart of the microcontroller according to the Modification 1 and the Modification 2 of the embodiment;

DETAILED DESCRIPTION

Figure 14:
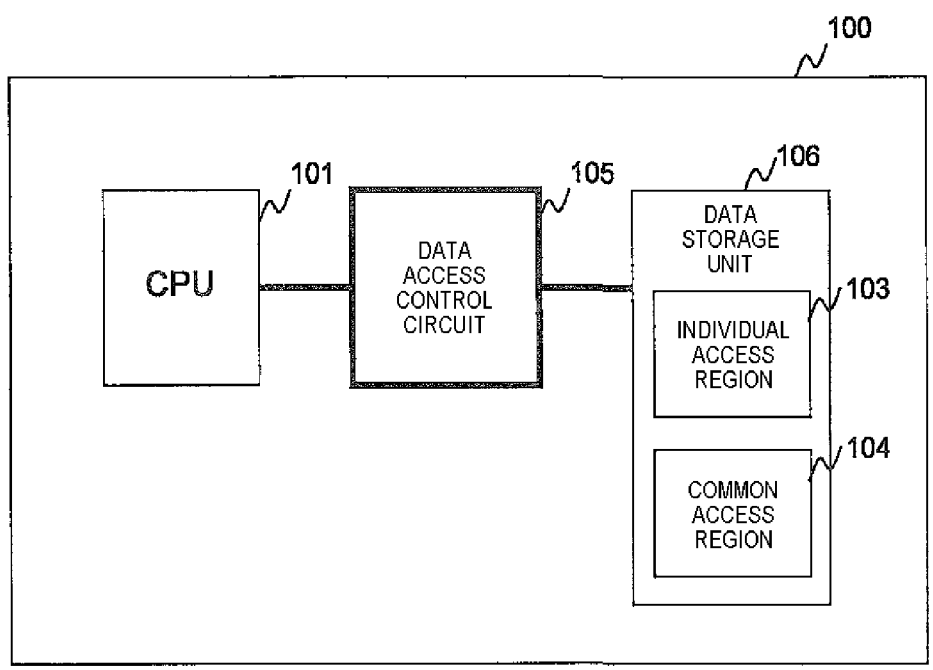
FIG. 14 is a block diagram of a semiconductor integrated circuit device according to the embodiment.

FIG. 14 is a block diagram of a semiconductor integrated circuit device according to an embodiment. A semiconductor integrated circuit device 100 has a CPU 101, a data access control circuit 105, and a data storage unit 106. The CPU 101 sequentially executes two processing units referred to as threads for failure detection. The data access control circuit 105 is a circuit configured to control a data access of the CPU 101 to the data storage unit 106. Here, the data storage unit 106 has a storage region individually corresponding to two threads (individual access region 103) and a storage region common to two threads (common access region 104).

The data access control circuit 105 generates an individual access based on performing the execution processing of the thread on the individual access region 103 of the data storage unit 106 from the CPU 101 and a shared access based on performing the execution processing of the thread on the common access region 104. Due to this, it is made possible to perform execution processing different among two threads, and thus it is possible to reduce the occurrence of the same failure.

Furthermore, the data access control circuit 105 makes a comparison between the commands and the addresses, respectively, in the shared access based on the results of the execution processing of the two threads. Here, the commands include a read access and a write access. By making a comparison between the commands and the addresses, respectively, in the shared access based on the results of the execution processing of the two threads in the data access control circuit 105, it becomes possible to perform failure detection of the CPU 101. Moreover, it becomes unnecessary for the CPU 101 to perform processing to compare the access data associated with the shared access based on the execution of the thread, and thus a high-speed operation of the semiconductor integrated circuit device becomes possible.

[Embodiment]

Hereinafter, embodiments are explained in detail with reference to the drawings.

The following embodiments will be explained, divided into plural sections, if necessary for convenience. Except for the case where it shows clearly in particular, they are not mutually unrelated and one has relationships such as a modification, application examples, detailed explanation, and supplementary explanation of some or entire of another. In the following embodiments, when referring to the number of elements and the like. (including the number, a numeric value, an amount, a range, etc., they may be not restricted to the specific number but may be greater or smaller than the specific number, except for the case where they are clearly specified in particular and where they are clearly restricted to a specific number theoretically.

Furthermore, in the following embodiments, an element (including an operation, a timing chart, an element step, an operation step, and the like) is not necessarily indispensable, except for the case where it is clearly specified in particular and where it is considered to be clearly indispensable from a theoretical point of view, or the like. Similarly, in the following embodiments, when shape, position relationship, and the like of an element or the like are referred to, what resembles or is similar to the shape substantially shall be included, except for the case where it is clearly specified in particular and where it is considered to be clearly not right from a theoretical point of view. This statement also applies to the number and the like described above (including the number, a numeric value, an amount, a range, and the like).

Note that, in all the drawings for explaining embodiments, the same or related symbol is attached to the region or member having the same function, and the repeated explanation thereof is omitted. Furthermore, in the following embodiments, explanation of the same or similar part is not repeated as a principle except for the case where necessary.

1. Configuration

Figure 1:
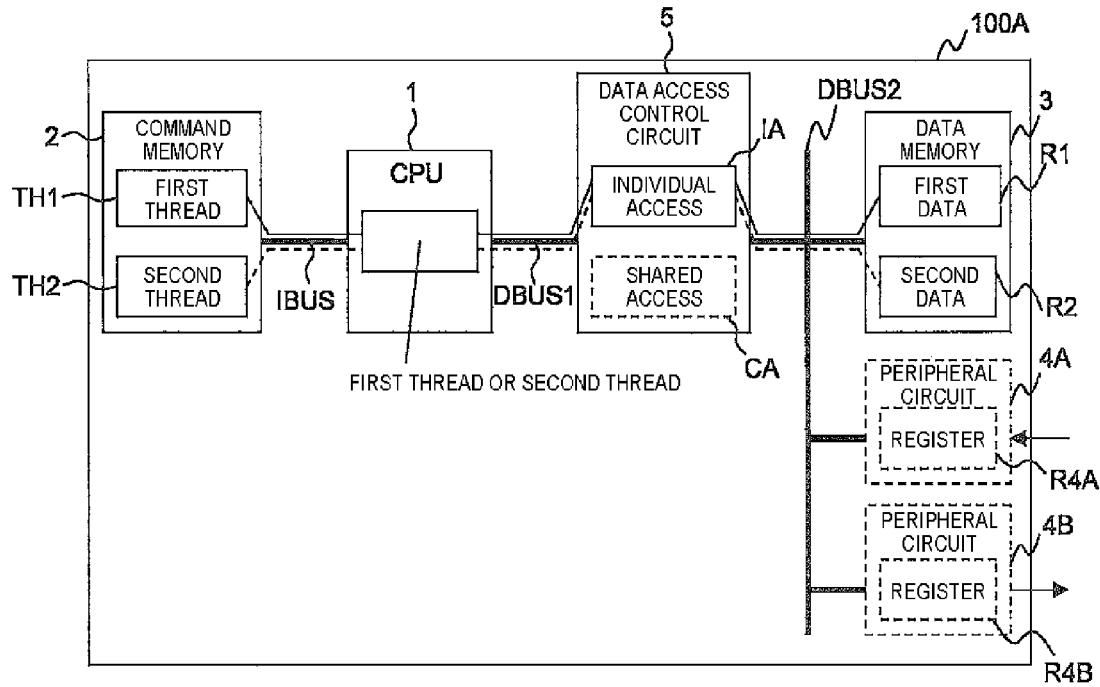
FIG. 1 is a diagram showing an operation of an individual access in which a CPU performs a data access for each thread according to an embodiment.
Figure 2:
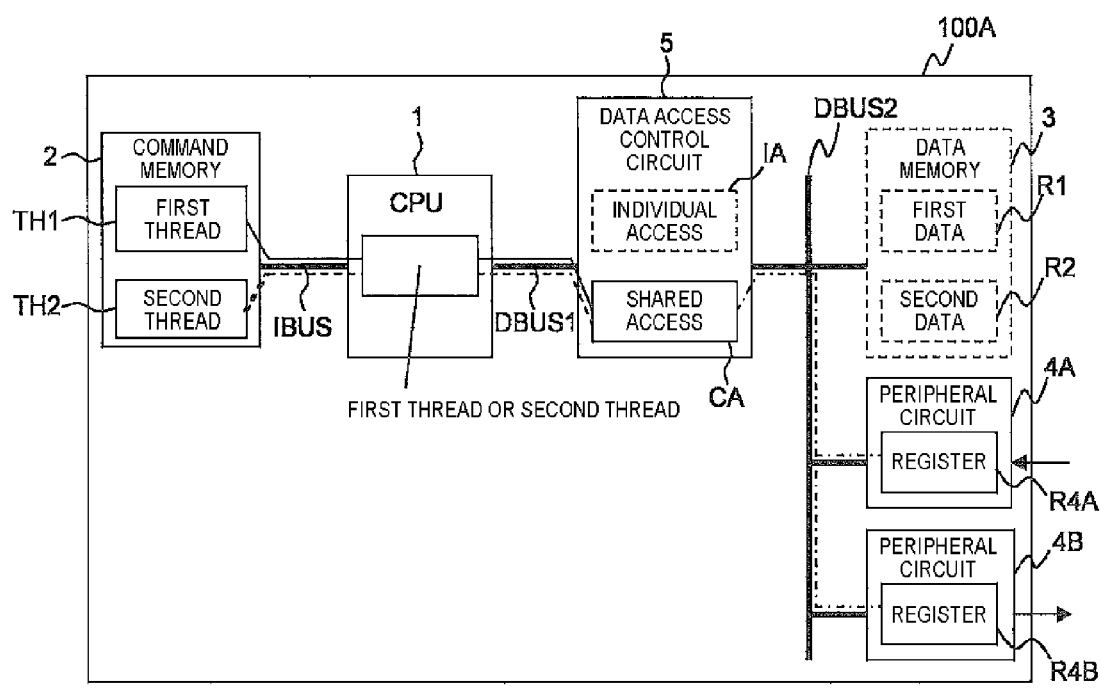
FIG. 2 is a diagram showing an operation of a shared access in which the CPU performs the data access based on processing results of two threads according to the embodiment.
Figure 15:
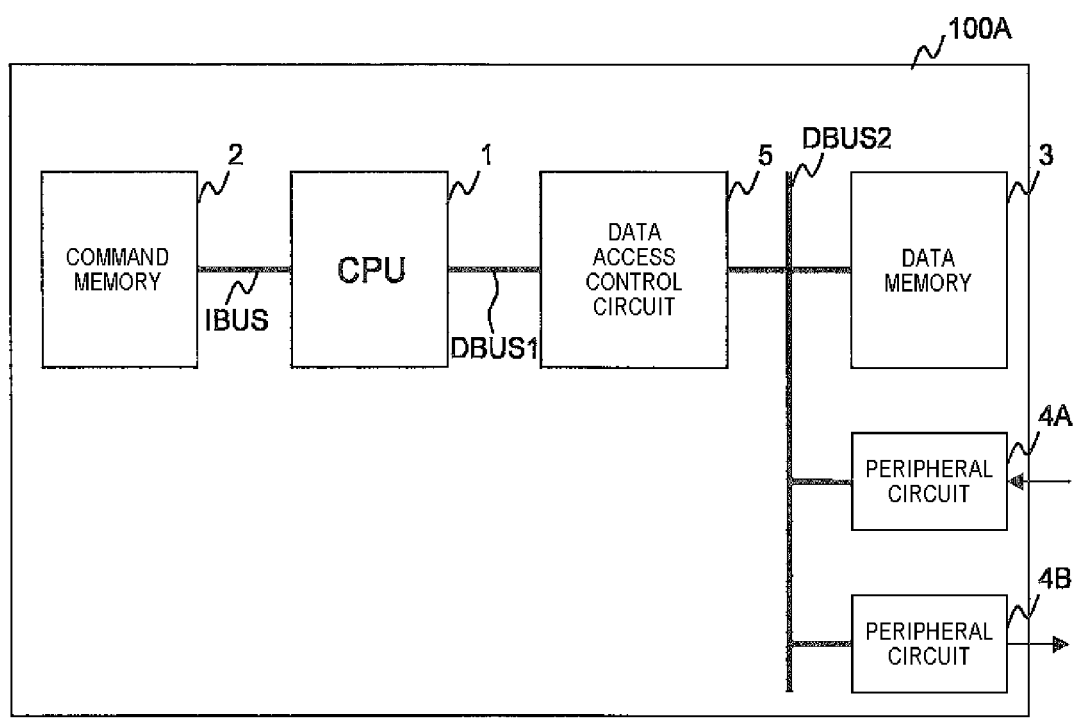
FIG. 15 is a block diagram of the microcontroller according to the embodiment.

FIG. 15 is a block diagram of a microcontroller according to an embodiment. In the microcontroller according to the embodiment, a single core CPU executes software of two threads to thereby perform duplexing processing. FIG. 1 is a diagram showing an operation of an individual access in which the CPU according to the embodiment performs a data access for each thread. FIG. 2 is a diagram showing an operation of a shared access in which the CPU according to the embodiment performs a data access on the basis of the processing results of two threads.

A microcontroller 100A is a semiconductor integrated circuit device formed over one semiconductor substrate. The microcontroller 100A is sealed with resin into a QFP (Quad Flat Package)-type package or BGA (Ball Grid Array)-type package. The microcontroller 100A has a CPU 1, a command memory 2, a data memory 3, peripheral circuits 4A and 4B, and a data access control circuit 5. The CPU 1 is coupled to the command memory 2 by a command bus IBUS. The CPU 1 is coupled to the data access control circuit 5 by a data bus DBUS1. The data access control circuit 5 is coupled to the data memory 3 and the peripheral circuits 4A and 4B by a data bus DBUS2. The CPU 1 is a single thread CPU and executes a processing unit called a thread sequentially. The command memory 2 stores commands processed by the CPU 1. The command memory 2 stores a first thread and a second thread. The command memory 2 stores programs being executed by the CPU 1 and having a plurality of threads including a first thread TH1 and a second thread TH2. The data memory 3, which is the individual access region of the data storage unit, stores data processed by the CPU 1. The peripheral circuits 4A and 4B are the common access regions of the data storage unit. The peripheral circuit 4A is, for example, an A/D converter (analog-to-digital converter) having a function to convert an analog signal into a digital signal and store the digital signal in a register. The peripheral circuit 4B is, for example, a timer (for example, a motor control signal generation circuit) configured to output a pulse having a period and width, written and set in a register by the CPU 1. The data access control circuit 5 is a circuit configured to control the data access of the CPU 1.

The data storage region of the data memory 3 and the data storage regions of the registers of the peripheral circuit 4A and the peripheral circuit 4B are in the form of being indicated by a first address as a logical address, which is an address viewed from the CPU 1. The data access control circuit 5 generates an individual access from the CPU 1 to the data memory 3 by performing processing to execute the first thread TH1 and the second thread TH2, respectively. Furthermore, the data access control circuit 5 generates a shared access, from the CPU 1 to the registers of the peripheral circuit 4A and the peripheral circuit 4B, based on the processing to execute both the first thread TH1 and the second thread TH2. The data access control circuit 5 detects a failure of the CPU 1 by comparing the commands and the first addresses, respectively, in the shared access based on the results of the processing to execute the first thread TH1 and the second thread TH2.

The individual access may be generated for the access of the registers of the peripheral circuit 4A and the peripheral circuit 4B and the shared access may be generated for the access of the data memory 3. By the data access control circuit 5, it becomes possible to perform failure detection of the CPU 1. Furthermore, it becomes unnecessary for the CPU 1 to perform the comparison processing of the access data associated with the shared access based on the execution of the first thread TH1 and the second thread TH2, and thus a high-speed operation of the microcontroller becomes possible. Moreover, the programs for the comparison processing of the access data associated with the shared access based on the execution of the first thread TH1 and the second thread TH2 become unnecessary, and thus it becomes possible to secure an empty region of the command memory 2.

2. Operation

Figure 16:
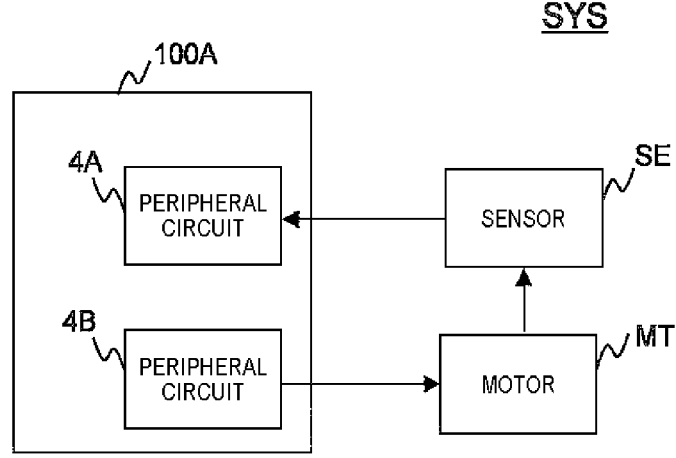
FIG. 16 is a block diagram of a system using the microcontroller according to the embodiment.

Using FIG. 1 and FIG. 2, detailed explanation will be given continuously. FIG. 16 is a block diagram showing a system using the microcontroller of the embodiment. A system SYS is a motor control device in which a motor MT is controlled by the microcontroller 100A. The motor MT includes a motor and circuits configured to drive the motor. As software being programs executed by the CPU 1 in the system SYS, the following examples will be considered.

(1) An analog signal from a sensor SE coupled to the outside of the microcontroller 100A is converted into a digital signal in the peripheral circuit 4A.

(2) The CPU 1 reads the digital signal and executes operation processing.

(3) Based on the calculation result, a pulse period and a width are set for the peripheral circuit 4B, to thereby change the pulse output, and thus the rotation speed of the motor MT coupled to the outside of the microcontroller 100A is controlled.

The programs from (1) to (3) described above are subjected to duplexing processing in the first thread TH1 and the second thread TH2, and it is possible to execute the operation processing by using the data memory 3 for each thread. Since the CPU 1 of the microcontroller 100A operates using the first thread TH1 and the second thread TH2, the duplexing processing is performed by a first function executed through processing of the first thread TH1 by the CPU 1, and by a second function executed through processing of the second thread TH2 by the CPU 1. The CPU 1 can process one thread at one time, and thus the CPU 1 executes anyone of the threads first, and then switches it to the other thread when the execution is completed. The data access control circuit 5 determines, by addresses, two types of accesses, that is, an individual access IA executed each time the thread is processed and a shared access CA executed when two threads are processed and automatically performs the processing. The data memory 3 is a target of the individual access for each thread, and the registers of the peripheral circuits 4A and 4B are targets of the shared access common to the threads.

As shown in FIG. 1, by the execution processing of the first thread TH1 and the second thread TH2, respectively, the individual access from the CPU 1 to the data memory 3 is generated. As a result of the individual access generated by the execution of the first thread TH1, first data R1 is stored in the data memory 3 as a processing result. As a result of the individual access generated by the execution of the second thread TH2, second data R2 is stored in the data memory 3 as a processing result. As shown in FIG. 2, there is generated the shared access, from the CPU 1 to the registers of the peripheral circuits 4A and 4B, based on the execution processing of both the first thread TH1 and the second thread TH2. By executing the first thread TH1 and the second thread TH2, the CPU 1 reads an A/D conversion result stored in a register R4A of the peripheral circuit 4A and writes a pulse period and a width to a register R4B of the peripheral circuit 4B. This case is divided into four cases and will be explained below in more detail.

(1) If the thread earlier executed indicates a read access of the register R4A of the peripheral circuit 4A, the data access control circuit 5 accesses the register R4A of the peripheral circuit 4A and causes the CPU 1 to read the read data.

(2) If the thread later executed indicates the read access of the register R4A of the peripheral circuit 4A, the data access control circuit 5 performs the following processing without accessing the register R4A of the peripheral circuit 4A. The command and the address of the read access earlier executed and the command and the address of the read access later executed are compared and when they agree, the CPU 1 is caused to read the read data read by the read access earlier executed.

(3) If the thread earlier executed indicates a write access of the register R4B of the peripheral circuit 4B, the data access control circuit 5 completes the processing without accessing the register R4B of the peripheral circuit 4B.

(4) If the thread later executed indicates the write access of the register R4B of the peripheral circuit 4B, the command, the address, and the write data of the write access earlier executed and the command, the address, and the write data of the write access later executed are compared, respectively, and when they agree, the write access is performed on the register R4B of the peripheral circuit 4B.

Figure 3:
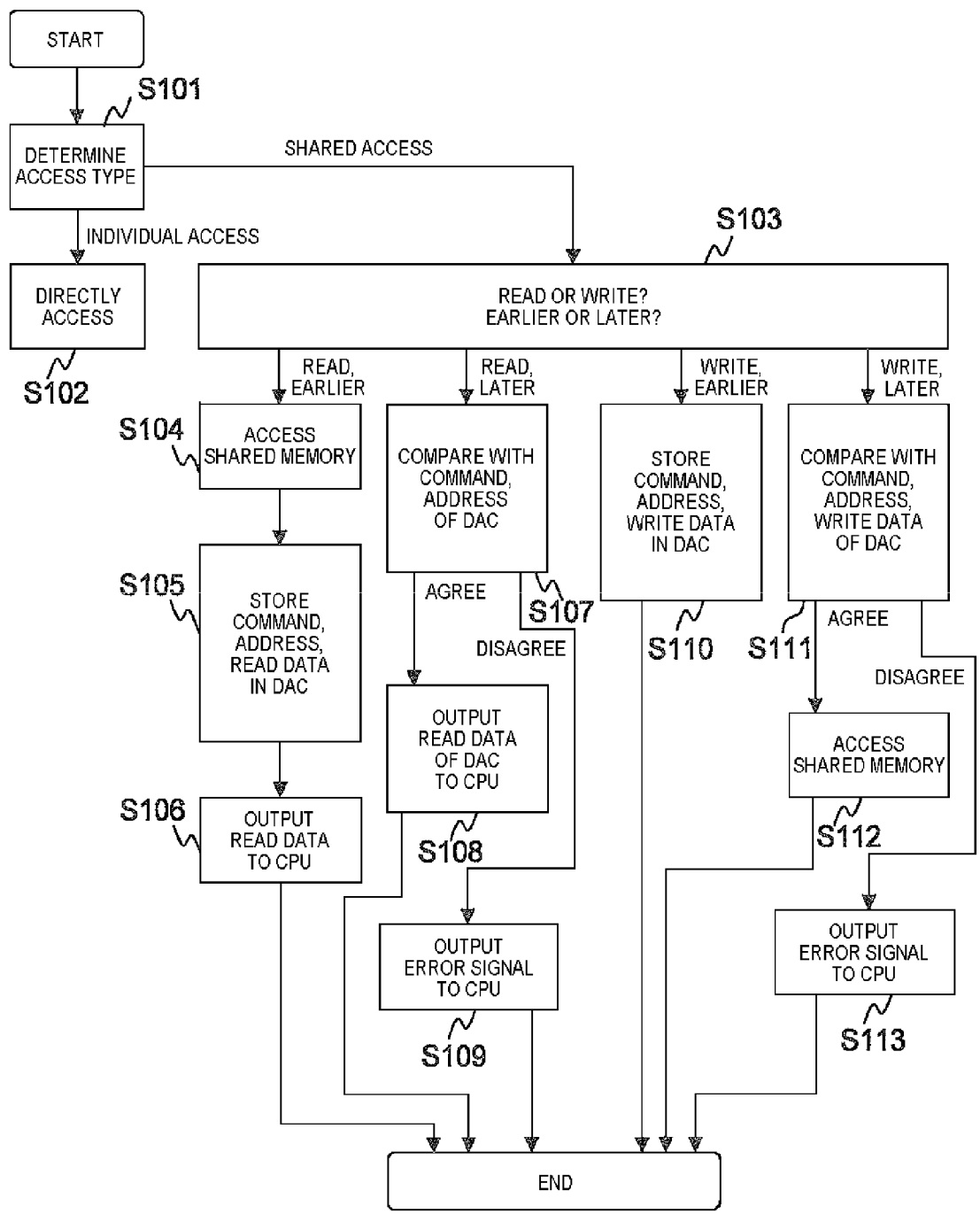
FIG. 3 is an operation flowchart of a data access of a microcontroller according to the embodiment.

FIG. 3 is an operation flowchart of the data access of the microcontroller according to the embodiment. In the flowchart, DAC is an abbreviation of the data access controller. A more detailed operation will be explained below using the flowchart.

When the CPU 1 starts a data access, as shown at step S101, the data access control circuit 5 determines the access type by the address for the data access. As shown at step S102, in the case where it is determined that the data access is the individual access at step S101, the data access control circuit 5 directly executes the access. As shown at step S103, in the case where it is determined that the data access is the shared access at step S101, the data access control circuit 5 performs the following four divided pieces of processing depending on whether the command is a read access or a write access and whether the access is one by the thread earlier executed or one by the thread later executed.

(1) Read/Thread Earlier Executed

As shown at step S104, in the case where it is determined that the command is a read access and the access is one by the thread earlier executed at step S103, the data access control circuit 5 accesses the shared memory (indicating a region (shared access region) that is a target of the shared access, such as the registers of the peripheral circuits 4A and 4B). Next, as shown at step S105, the command, the address, and the read data are stored in the DAC. Finally, as shown at step S106, the data access control circuit 5 outputs the read data to the CPU 1 and causes the CPU 1 to read the output data.

(2) Read/Thread Later Executed

As shown at step S107, in the case where it is determined that the command is a read access and the access is one by the thread later executed at step S103, the data access control circuit 5 compares the command and the address for the access with the values stored in the DAC. As shown at step S108, in the case where the comparison results agree at step S107, the data access control circuit 5 outputs the read data stored in the DAC to the CPU 1, and causes the CPU 1 to read the output data. As shown at step S109, in the case where the comparison results disagree at step S107, the data access control circuit 5 outputs an error signal to the CPU 1.

(3) Write/Thread Earlier Executed

As shown at step S110, in the case where it is determined that the command is a write access and the access is one by the thread earlier executed at step S103, the data access control circuit 5 stores the command, the address, and the write data in the DAC.

(4) Write/Thread Later Executed

As shown at step S111, in the case where it is determined that the command is a write access and the access is one by the thread later executed at step S103, the data access control circuit 5 compares the command, the address, and the write data for the access with the values stored in the DAC. As shown at step S112, in the case where the comparison results agree at step S111, the data access control circuit 5 accesses the shared memory and causes the CPU 1 to write the write data. As shown at step S113, in the case where the comparison results disagree at step S111, the data access control circuit 5 outputs an error signal to the CPU 1.

The above embodiment will be summarized as follows.

(1) The data access control circuit 5 executes two types of accesses: the individual access in which the data access of the CPU 1 is performed for each thread, and the shared access in which the data access of the CPU 1 is performed by executing the two threads. Because of this, it is possible to execute operation processing by using the data memory 3 for each thread. Furthermore, it is made possible to perform execution processing different in the two threads. Moreover, it is possible to reduce the occurrence of the same failure.

(2) The data access control circuit 5 determines, by the addresses from the CPU 1, the two types of accesses, that is, the individual access in which the data access of the CPU 1 is performed each time the thread is executed and the shared access performed on the basis of the processing of the two threads. Because of this, it is possible to automatically process the individual access and the shared access.

(3) The data access control circuit 5 makes a comparison between the commands and the addresses, respectively, in the shared access generated by the execution of the two threads. Because of this, it becomes possible to detect a failure of the CPU 1. Furthermore, it becomes unnecessary for the CPU 1 to perform processing to compare the access data through the use of software associated with the shared access based on the execution of the two threads.

(4) The data access control circuit 5 makes a comparison among the commands, the addresses, and the write data in the shared access performed once on the basis of the processing of the two threads. Because of this, it becomes unnecessary for the CPU 1 to perform processing to compare the access data before performing writing to the shared memory.

(5) In the read access of the shared access, the data access control circuit 5 accesses the shared memory in the thread earlier executed and causes the CPU 1 to read the read data, and causes the CPU 1 to read the read data based on the thread earlier executed in the thread later executed. Because of this, it is possible to cause the CPU 1 to read the common read data in the read access generated when the two threads are executed.

(6) In the write access of the shared access, the data access control circuit 5 makes a comparison among the commands, the addresses, and the write data of the two threads and executes the write access if they agree. Because of this, it is possible to perform the correct write access because of the existence of the comparison processing in the write access generated when the two threads are executed.

(7) By combining (1), (2), and (3) described above, it is possible to detect a failure of the read access. Furthermore, by combining (5) described above, it is possible to perform the correct read access.

(8) By combining (1), (2), and (4) described above, it is possible to detect a failure of the write access. Moreover, by combining (6) described above, it is possible to perform the correct write access.

(Modification 1)

Figure 4:
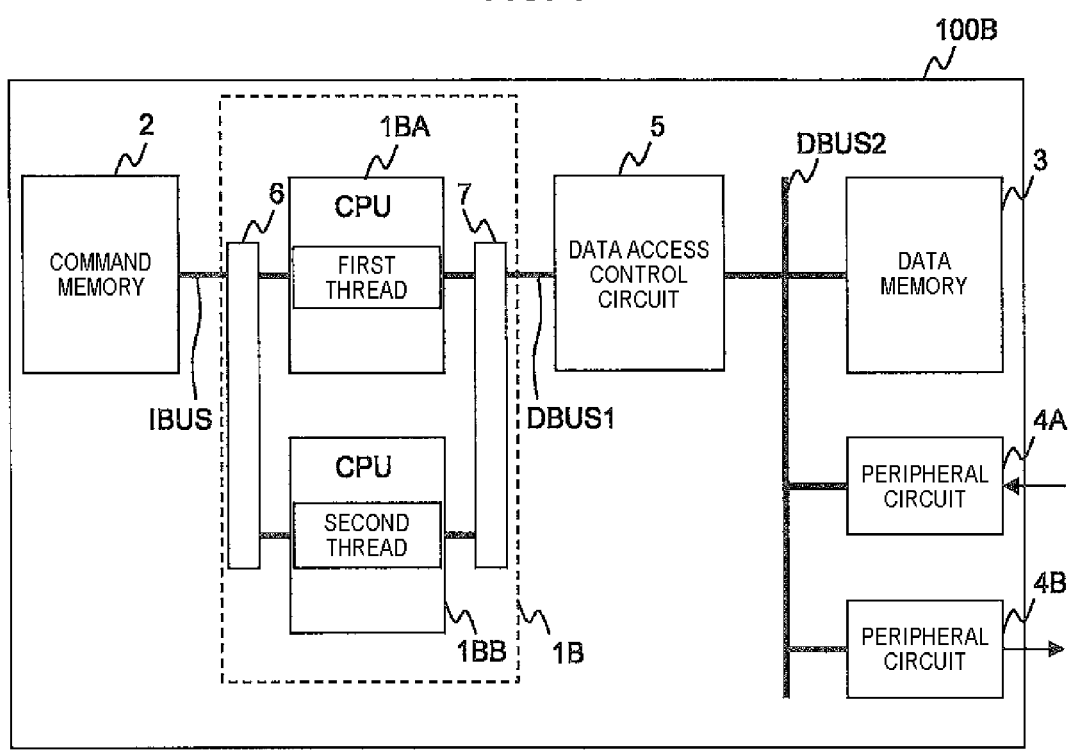
FIG. 4 is a block diagram of a microcontroller according to a Modification 1 of the embodiment.

FIG. 4 is a block diagram of a microcontroller according to a Modification 1 of the embodiment. In the microcontroller according to the Modification 1, a dual core CPU executes the threads, and thus the duplexing processing is performed, respectively. In comparison with the microcontroller 100A according to the embodiment in FIG. 15, a microcontroller 100B uses a CPU 1B in place of the CPU 1. In the CPU 1B, between CPUs 1BA and 1BB and the command memory 2, an arbiter 6 is arranged and between the CPUs 1BA and 1BB and the data access control circuit 5, an arbiter 7 is arranged. Other than the above, the same applies to the microcontroller 100A of the embodiment and duplicated explanation is omitted. Each of the CPUs 1BA and 1BB is basically the same as the CPU 1.

The first thread TH1 and the second thread TH2 are processed in parallel in the CPU 1BA and the CPU 1BB, respectively. The command memory 2 and the data access control circuit 5 are used in common by the CPUs 1BA and 1BB, and thus the arbiter 6 and the arbiter 7 determine the priority of the accesses, respectively, and the accesses are processed sequentially. That is, it is not possible for the CPU 1BA and the CPU 1BB to fetch a command from the command memory 2 in the same cycle or for the CPU 1BA and the CPU 1BB to read or write data in the same cycle. Because of this, the CPU 1BA and the CPU 1BB execute the threads with at least one cycle being shifted, and thus it is possible to reduce the occurrence of the same failure.

It is possible to apply the microcontroller 100B according to the Modification 1, to the system SYS.

(Modification 2)

Figure 5:
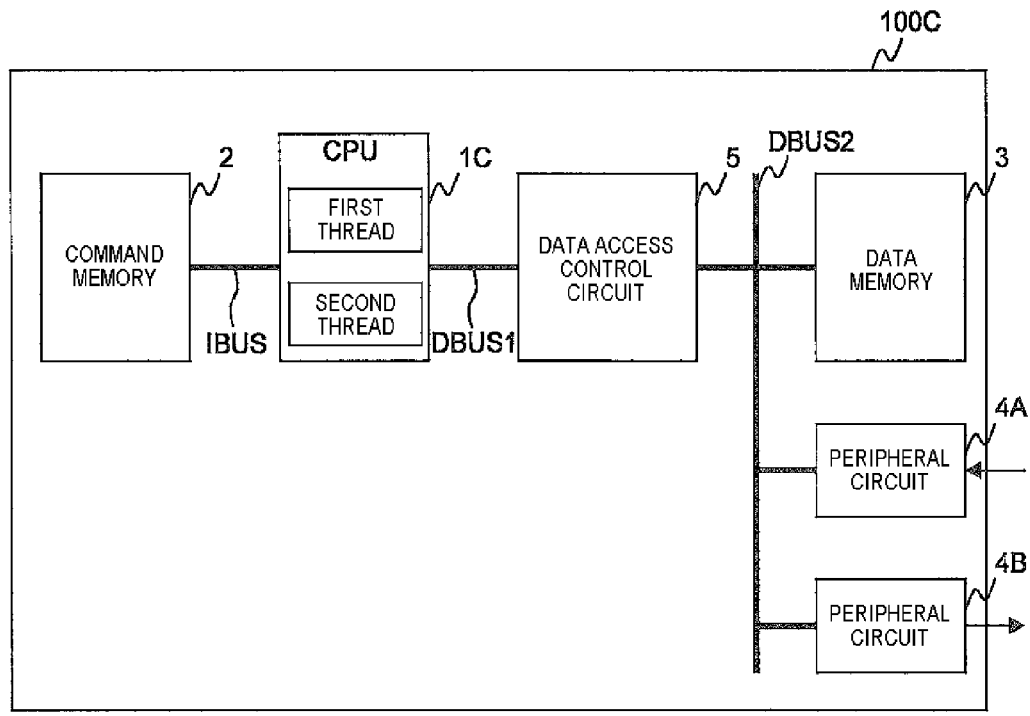
FIG. 5 is a block diagram of a microcontroller according to a Modification 2 of the embodiment.

FIG. 5 is a block diagram of a microcontroller according to a Modification 2 of the embodiment. A microcontroller 100C according to the Modification 2, in which the duplexing processing is performed by a single core CPU having a hardware multithread function executing two threads, uses a CPU 1C in place of the CPU 1 in comparison with the microcontroller 100A according to the embodiment in FIG. 15. Parts other than the above are the same as those of the microcontroller 100A of the embodiment and duplicated explanation is omitted.

The CPU 1C is a single core CPU having the hardware multithread function and is capable of executing the first thread and the second thread in parallel. Here, the hardware multithread means that a plurality of threads is executed in parallel by hardware in the CPU while the threads are switched at least in each cycle. The multithread in the embodiment, the Modification 1, Patent Document 2, and Patent Document 3 is also referred to as software multithread in order to be distinguished from the hardware multithread. An example of the hardware multithread CPU is disclosed in Japanese Patent Laid-Open No. 2010-86128.

The first thread and the second thread are processed, respectively, in the CPU 1C while being switched in units of clock cycles. Because of this, the CPU 1C executes the two threads with at least one cycle being shifted, and thus it is possible to reduce the occurrence of the same failure.

It is possible to apply the microcontroller 100C according to the Modification 2, to the system SYS.

3. Data Access Timing

Figure 6:
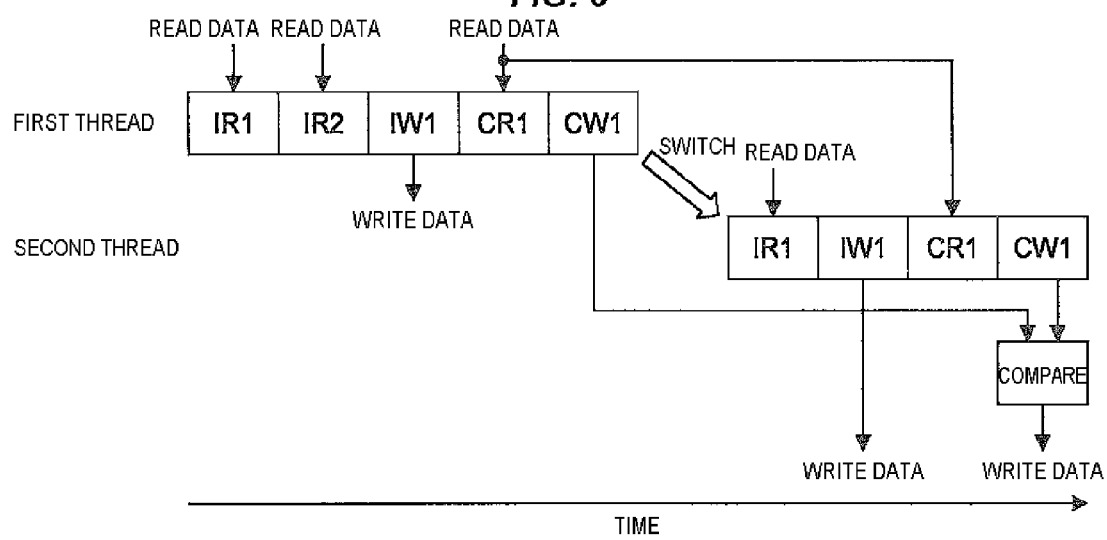
FIG. 6 is a data access timing chart of a microcontroller according to the embodiment.

FIG. 6 is a data access timing chart of the microcontroller according to the embodiment. It is assumed that the first thread performs five data accesses: a first read access to the individual access region (abbreviated as IR1), a second read access to the individual access region (abbreviated as IR2), a first write access to the individual access region (abbreviated as IW1), a first read access to the shared access region (abbreviated as CR1), and a first write access to the shared access region (abbreviated as CW1). Furthermore, it is assumed that the second thread performs four data accesses: IR1, IW1, CR1, and CW1. After performing the five data accesses by executing the first thread, the CPU 1 switches the execution to that of the second thread. After that, the CPU 1 performs the four data accesses by executing the second thread. After comparing the result of CW1 of the second thread and the result of CW1 of the first thread, the data access control circuit 5 sends the write data to the shared region. The first thread and the second thread are switched and executed at intervals of a plurality of pieces of processing, and thus it is possible to reduce the occurrence of the same failure.

As described above, the threads as software to be subjected to the duplexing processing are not necessarily the same and it is possible to carry out diversification such as change of the operation algorithm in accordance with the necessity. It is possible to diversify the operation commands that use the internal register of the CPU 1 as their input and output and the data access commands to perform the individual access, but the data access commands to perform the shared access are not diversified and are made the same between the two threads. That is, the shared access is executed between the two threads, respectively, in the same order and with the same contents, and thus it becomes possible to easily make a comparison. The read data read in CR1 of the first thread is read by the CPU 1 in CR1 of the second thread. The write data output in CW1 of the first thread is compared with the address of CW1 of the second thread and the write access is executed after agreement is confirmed. Consequently, it is possible to make different from each other, the first thread and the second thread, which are software to be duplexed. It is possible to make different from each other, the individual read and the individual write between the first thread and the second thread. However, the shared read and the shared write are required to be the same between the first thread and the second thread including the order. Furthermore, the outputs to the registers of the peripheral circuit 4A and the peripheral circuit 4B are required to be the same.

Although the method for creating the first thread and the second thread as described above is not limited in particular, it may also be possible to create them by performing different compiles (first compile and second compile) on one original program. The original program on which the first compile is performed is the first thread and the original program on which the second compile is performed is the second thread. As another method, it may also be possible to change the coding itself between the first thread and the second thread. As described above, the individual access may be different between the first thread and the second thread. Because of this, if the results of the individual accesses are compared, the comparison results disagree even if no failure has occurred, and thus an error occurs. In the shared access, because the same result is to be output, the comparison results do not disagree unless a failure occurs, and thus it becomes possible to detect a failure by making a comparison of the results in the shared access between the first thread and the second thread. Note that in the case where a comparison of the processing results is made between two threads in all the data accesses, without classifying accesses into individual accesses and shared accesses, it is necessary to make the programs in the first thread and in the second thread the same. In such a case, it becomes difficult to avoid the occurrence of the same failure that occurs when the program itself has a problem or the like.

FIG. 6 shows an example of the shared access having one read access and one write access, respectively, but the embodiment is not limited thereto.

FIG. 7 is a data access timing chart of the microcontroller according to the Modification 1 and the Modification 2 of the embodiment. The contents of the data access of the first thread and the second thread are the same as those in the case of the single core CPU in FIG. 6, but the first thread and the second thread are processed in parallel in the CPU 1B and the CPU 1C, respectively, and thus they are performed alternately. In FIG. 6, CR1 and CW1 of the first thread are earlier executed than CR1 and CW1 of the second thread, respectively, but in FIG. 7, CR1 and CW1 of the second thread are earlier executed than CR1 and CW1 of the first thread, respectively, because the second thread does not include IR2 in comparison with the first thread.

FIG. 7 shows an example in which the shared access has one read access and one write access, respectively, but the embodiment is not limited thereto.

4. Data Access Control Circuit

Figure 8A:
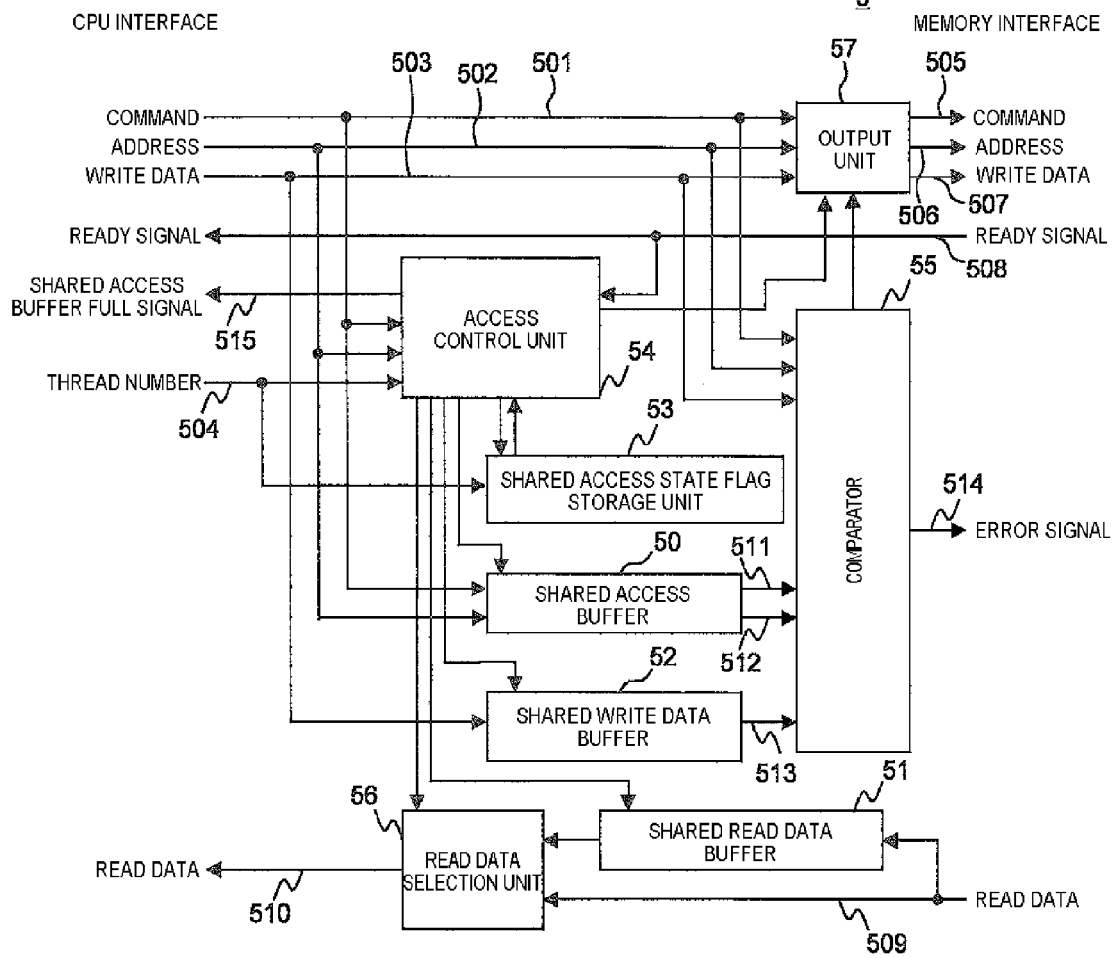
FIGS. 8A and 8B are block diagrams of a data access control circuit of the microcontroller according to the embodiment, the Modification 1, and the Modification 2.
Figure 8B:
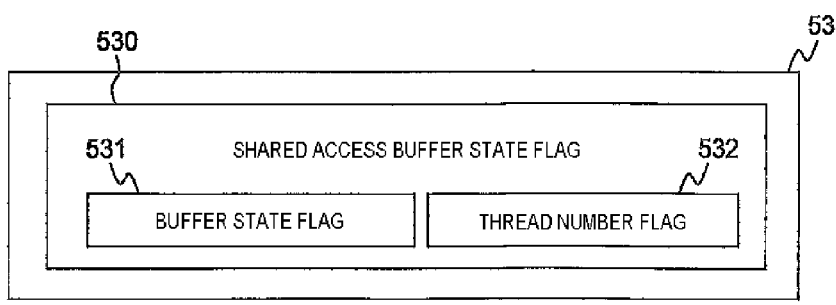

FIGS. 8A and 8B are block diagrams of the data access control circuit of the microcontroller according to the embodiment, the Modification 1, and the Modification 2. FIG. 8A is a block diagram of the whole of the data access control circuit and FIG. 8B is a block diagram of a shared access state flag storage unit. The data access control circuit 5 has interfaces with the CPU (general term of the CPUs 1, 1B, and 1C) and the memory (general term of the data memory 3 and the peripheral circuits 4A and 4B). From the CPU, the command, the address, the write data (effective only in the write access), and the thread number of the data access are input to signal lines 501, 502, 503, and 504, respectively, and the command, the address, and the write data of the data access are output to the memory via signal lines 505, 506, and 507. When the access is completed, a ready signal is output to a signal line 508 from the memory and the CPU completes the data access. The ready signal is also used for inputting the command, the address, the write data, and the thread number, which are output from the CPU. Consequently, the ready signal is output to the signal line 508 from the memory in order to indicate that the command, the address, the write data, and the thread number are ready to be input from the CPU. In the case of the read access, the read data read from the memory is output to the CPU. It is sufficient to have a field that stores the thread numbers in the control register of the CPU and to set the thread number at the time of the start of the thread. In the case of the single core CPU of the First Embodiment, the thread number is output after several commands are executed at the time of switching of threads. The dual core CPU of the Modification 1 and the CPU having the hardware multithread function of the Modification 2 each have the control register for each core or thread, and each control register has the field that stores the thread numbers.

The data access control circuit 5 has a shared access buffer 50, a shared read data buffer 51, a shared write data buffer 52, a shared access state flag storage unit 53, an access control unit 54, a comparator 55, a read data selection unit 56, and an output unit 57.

The shared access buffer 50 registers the command and the address of the access earlier executed of the shared access from the two threads. As will be described later, in the case where the CPU 1 of the embodiment is used, that is, in the case where the shared access from the thread registered in the shared access buffer 50 first is executed continuously, it is necessary to provide the shared access buffer 50 in a capacity corresponding to a plurality of entries. In the case where the CPUs 1A and 1B of the Modification 1 and the CPU 1C of the Modification 2 are used, it is necessary to provide the shared access buffer 50 in a capacity corresponding to at least one entry. Here, one entry refers to the command and the address input when the access is performed once.

The shared read data buffer 51 registers the read data read from the memory to a signal line 509 in the case where the shared access earlier executed is the read access. The possible number of entries of the shared read data buffer 51 is the same as that of the shared access buffer 50.

The shared write data buffer 52 registers the write data the CPU outputs to the signal line 503 in the case where the shared access earlier executed is the write access. The possible number of entries of the shared write data buffer 52 is the same as that of the shared access buffer 50.

As shown in FIG. 8B, the shared access state flag storage unit 53 includes a buffer state flag 531 and a thread number flag 532. The shared access state flag and the thread number flag together are referred to as a shared access state flag 530. When the shared access buffer 50 is empty, the buffer state flag 531 indicates the unregistered state. In the case where the shared access buffer 50 is not empty, the buffer state flag 531 indicates the registered state and the thread number flag 532 indicates the thread number of the thread that has executed the access.

The access control unit 54 controls the execution of the individual access and the shared access by the command, the address, and the thread number, which the CPU outputs, and the shared access state flag 530. In the case where the address the CPU outputs indicates the individual access, the access control unit 54 outputs the command, the address, and the write data as they are from the output unit 57 to the memory via the signal lines 505, 506, and 507, respectively. In the case where the address the CPU outputs to the signal line 502 indicates the shared access, the access control unit 54 checks the shared access state flag 530, determines that it is the access to be earlier executed when the unregistered state is indicated, and registers the command and the address in the shared access buffer 50 and registers the thread number over the signal line 504 in the thread number flag 532 of the shared access state flag storage unit 53. Depending on the contents of the shared access state flag 530, each of the three divided operations as below is performed.

(1) In the Case Where the Shared Access State Flag 530 Indicates the Unregistered State In the case of the read access, the command and the address are output from the output unit 57 to the memory via the signal lines 506 and 507 and the read data is read from the memory to the signal line 509. The read data that is read is output to the CPU via the read data selection unit 56 and the signal line 510, and also is registered in the shared read data buffer 51. In the case of the write access, an NOP (No Operation) command is output from the output unit 57 to the signal line 505, and the write data the CPU outputs to the signal line 503 is registered in the shared write data buffer 52.

(2) In the Case Where the Shared Access State Flag 530 Indicates the Registered State and the Thread Number is Different from that of the Shared Access In this case, it is determined that the access is the one of the thread to be later executed, and the three operations as below are performed.

(A) The command and the address the CPU outputs to the signal lines 501 and 502, and the command and the address output from the shared access buffer 50 to signal lines 511 and 512 are compared by the comparator 55.

(B) The operations are performed as below depending on whether the shared access is the read access or the write access.

(a) When the Shared Access is the Read Access

The NOP command is output from the output unit 57 to the memory via the signal line 505, and the shared read data buffer 51 is selected by the read data selection unit 56, and is output to the CPU via the signal line 510.

(b) When the Shared Access is the Write Access

The write data the CPU outputs to the signal line 503 and the write data output from the shared write data buffer 52 to a signal line 513 are compared by the comparator 55. In this comparison, when disagreement is detected by the comparator 55, an error signal is output to the CPU via a signal line 514 and the NOP command is output to the memory via the signal line 505. In this comparison, when agreement is detected by the comparator 55, the command, the address, and the write data are output from the output unit 57 to the memory via the signal lines 505, 507, and 508, respectively.

(C) When the shared access of the thread to be later executed is completed, the entries compared between the shared access buffer 50, the shared read data buffer 51, and the shared write data buffer 52 are deleted to be put into the empty state, and when all the entries in the shared access buffer 50 are deleted, the shared access state flag 530 is set to the unregistered state.

(3) In the Case Where the Shared Access State Flag 530 Indicates the Registered State and the Thread Number of the Shared Access is the Same In this case, it is determined that the access is the access of the thread to be earlier executed of the next shared access, and the two operations as below are performed.

(A) In the case where there is an empty space for the entry in the shared access buffer 50, registration is performed and in the case where there is no empty space, a shared access buffer full signal indicating that the shared access buffer 50 is full is output to the CPU via a signal line 515. In the case where a plurality of entries can be registered in the shared access buffer 50, it is sufficient to manage the number of entries registered in the buffer by using a counter.

(B) In the case where the shared access buffer 50 becomes full, the CPU can take optimum measures as below depending on the type.

(a) Single Core CPU (CPU 1) of the Embodiment

The CPU 1 can avoid a dead lock (state where the CPU cannot escape from the incorrect operation state) by cancelling the shared access.

(b) Dual Core CPU (CPU 1B) of the Modification 1

The CPU 1B stalls the shared access and the data access arbiter causes the data access of the other CPU core to be performed in a preferential manner, and thus an empty space is produced in the shared access buffer 50 when the shared access to be later executed is executed, and the stall of the shared access can be cancelled.

(c) CPU (CPU 1C) Having the Hardware Multithread Function of the Modification 2

By skipping the shared access and causing the data access of another thread to be performed in a preferential manner, an empty space is produced in the shared access buffer 50 when the shared access to be later executed is executed, and the CPU 1C can cancel the skip of the shared access.

Note that the data access control circuit 5 incorporates a control register not shown schematically so that the address range of the individual access region and the shared access region can be changed. For example, in the initialization sequence of the microcontroller, it is possible to set the individual access region and the shared access region by writing to the above-mentioned control register.

Figure 9:
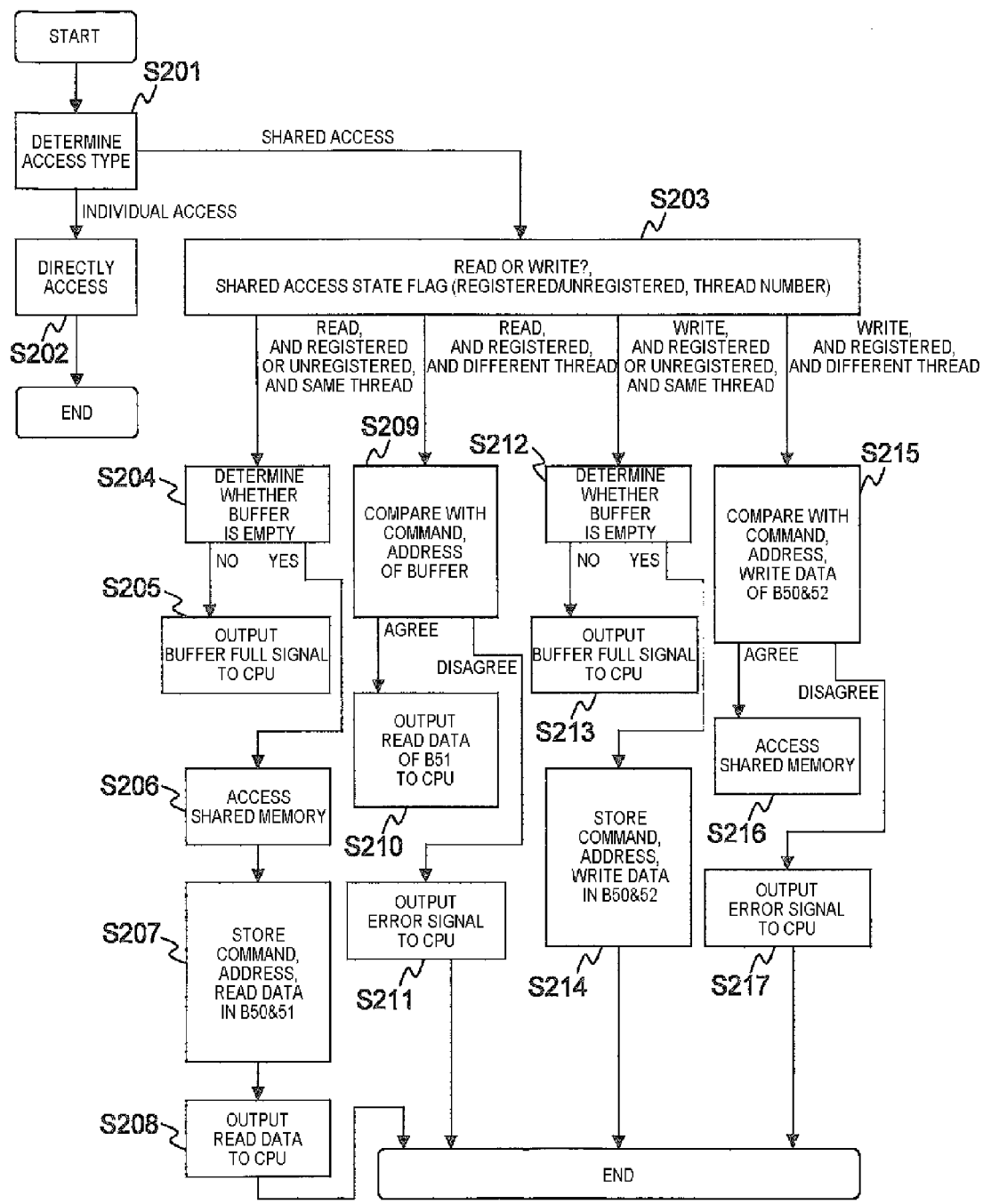
FIG. 9 is an operation flowchart of the data access control circuit in the microcontroller according to the embodiment, the Modification 1, and the Modification 2.

FIG. 9 is an operation flowchart of the data access control circuit of the microcontroller according to the embodiment, the Modification 1, and the Modification 2.

When the CPU starts the data access, as shown at step S201, the access control unit 54 determines the type of the access by the address specified by the data access. As shown at step S202, in the case where it is determined that the data access is the individual access at step S201, the access control unit 54 controls the output unit 57 and directly performs the access. As shown at step S203, in the case where it is determined that the data access is the shared access at step S201, the access control unit 54 performs four divided pieces of processing depending on whether the command is the read access or the write access and depending on a state (registered/unregistered, thread number) of the shared access state flag 530.

(1) Read/Thread Earlier Executed

When the command is the read access and one of the following two conditions applies, the access control unit 54 determines that the read access is the access of the thread earlier executed (step S203).

(a) The shared access state flag 530 indicates the unregistered state.

(b) The shared access state flag 530 indicates the registered state, and the thread number in the shared access this time and the thread number indicated by the shared access state flag 530 are the same.

In this case, as shown at step S204, the access control unit 54 checks whether the shared access buffer 50 is empty. At step S204 in FIG. 9, the shared access buffer 50 is represented as buffer (the same also applies to step S209 and step S212). Whether the shared access buffer 50 is empty is checked as follows. For example, in the case where there are four entries, a registration pointer indicating an entry to be registered and a read pointer to indicate an entry to be read for comparison are provided and 0 is set as initial values, respectively, and the value is updated as 0→1→2→3→0→ . . . every time registration (reading) is carried out. In the initial state, the registration pointer=the read pointer=0 holds, and thus the buffer state flag indicates the unregistered state. When registration is performed, the registration pointer becomes 1 and the registration pointer is not equal to the read pointer, and thus the buffer state flag indicates the registered state. When reading is carried out, the read pointer becomes 1 and the registration pointer and the read pointer are equal, and thus the buffer state flag indicates the unregistered state. After that, when registration is carried out three times, the registration pointer becomes 0 and the read pointer becomes 1. When registration is further carried out once, the registration pointer becomes 1 and the read pointer becomes 1, and thus there is no longer any empty space of the buffer. When the buffer is in the registered state, it can be determined that there is no empty space if the registration pointer becomes equal to the read pointer.

As shown at step S205, in the case where it is determined that there is no empty space in the shared access buffer 50 at step S204, the access control unit 54 outputs the shared access buffer full signal to the CPU. At step S205 in FIG. 9, the shared access buffer full signal is represented as buffer full signal (this also applies to step S213). As shown at step S206, in the case where it is determined that there is an empty space in the shared access buffer 50 at step S204, the access control unit 54 controls the output unit 57 and accesses the shared memory. After step S206, as shown at step S207, the access control unit 54 stores the command and the address in the shared access buffer 50 and stores the read data in the shared read data buffer 51. At step S207 in FIG. 9, the shared access buffer 50 and the shared read data buffer 51 together are represented as B50 & 51. As shown at step S208, the access control unit 54 controls the read data selection unit 56 and outputs the read data to the CPU to thereby cause the CPU to read the output data.

(2) Read/Thread Later Executed

When the command is the read access and both the following two conditions apply, the access control unit 54 determines that the read access is the access of the thread later executed (step S203).

(a) The shared access state flag 530 indicates the registered state.

(b) The thread number in the shared access this time and the thread number indicated by the shared access state flag 530 are different thread numbers.

In this case, as shown at step S209, the comparator 55 compares the command and the address in the shared access this time and the values stored in the shared access buffer 50, respectively. As shown at step S210, in the case where it is determined that they agree in the comparison processing at step S209, the access control unit 54 controls the read data selection unit 56, and outputs the read data stored in the shared read data buffer 51 to the CPU to thereby cause the CPU to read the output data. At step S210 in FIG. 9, the shared read data buffer 51 is represented as B51. As shown at step S211, in the case where it is determined that they disagree in the comparison processing at step S209, the comparator 55 outputs an error signal to the CPU.

(3) Write/Thread Earlier Executed

When the command is the write access and one of the following two conditions applies, the access control unit 54 determines that the write access is the access of the thread earlier executed (step S203).

(a) The shared access state flag 530 indicates the unregistered state.

(b) The shared access state flag 530 indicates the registered state, and the thread number in the shared access this time and the thread number indicated by the shared access state flag 530 are the same thread number.

In this case, as shown at step S212, the access control unit 54 checks whether the shared access buffer 50 is empty. As shown at step S213, in the case where it is determined that there is no empty space in the shared access buffer 50, the access control unit 54 outputs the shared access buffer full signal to the CPU. As shown at step S214, in the case where it is determined that there is an empty space in the shared access buffer 50 at step S212, the access control unit 54 stores the command and the address in the shared access buffer 50, and stores the write data in the shared write data buffer 52. At step S214 in FIG. 9, the shared access buffer and the shared write data buffer 52 together are represented as B50 & 52 (the same also applies to step S215).

(4) Write/Thread Later Executed

When the command is the write access and both the following two conditions apply, the access control unit 54 determines that the write access is the access of the thread later executed (step S203).

(a) The shared access state flag 530 indicates the registered state.

(b) The thread number in the shared access this time and the thread number indicated by the shared access state flag 530 are different thread numbers.

In this case, as shown at step S215, the comparator 55 makes a comparison among the command, the address, and the write data in the shared access this time and the command and the address in the shared access buffer 50, and the write data in the shared write data buffer 52, respectively. In the case where it is determined that the comparison results at step S215 agree, the access control unit 54 controls the output unit 57 and accesses the shared memory to thereby cause the shared memory to write the write data at step S216. In the case where it is determined that the comparison results at step S215 disagree, the comparator 55 outputs an error signal to the CPU at step S217.

The data access control circuit of the embodiment described above will be summarized as follows.

(1) The data access control circuit 5 has the shared access buffer 50 configured to register the command and the address of the access earlier executed of the shared access from the two threads, the shared read data buffer 51 configured to register the read data, and the shared write data buffer 52 configured to register the write data. Furthermore, the data access control circuit 5 has the shared access state flag storage unit 53 configured to store the shared access state flag 530 indicating the registered state of the shared access buffer 50 and the thread number of the thread that has performed the access. That is, by having the shared access buffer 50, the shared read data buffer 51, the shared write data buffer 52, and the shared access state flag storage unit 53, it is possible to determine whether the shared access is performed earlier or later and to make a comparison between the command, the address, and the access data of the shared access to be later executed.

(2) In the case where the shared access buffer 50 configured to register the command, the address, the read data, and the write data of the shared access earlier executed, the shared read data buffer 51, and the shared write data buffer 52 become full and the shared address of the thread having the same thread number indicated by the shared access state flag 530 is generated, it is possible to avoid the dead lock by performing the following processing.

(A) In the microcontroller 100A of the single core CPU (CPU 1) according to the embodiment, the data access is cancelled.

(B) In the microcontroller 100B of the multi-core CPU (CPU 1B) according to the Modification 1, until there is produced an empty space in the shared access buffer 50, the shared read data buffer 51 and the shared write data buffer 52, the data access is stalled and the data access of the other CPU core is caused to be performed in a preferential manner.

(C) In the microcontroller 100C of the CPU (CPU 1C) having the hardware multithread function according to the Modification 2, until there is produced an empty space in the shared access buffer 50, the shared read data buffer 51, and the shared write data buffer 52, the data access is skipped and the data access of the other thread is caused to be performed in a preferential manner.

Figure 17:
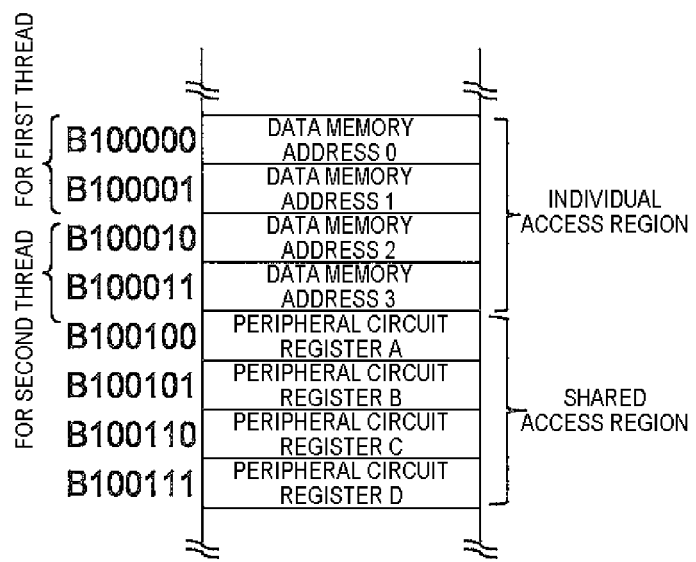
FIG. 17 is a diagram showing an address map of the data memory and the peripheral circuit register according to the embodiment.

FIG. 17 is a diagram showing an address map of the data memory and the peripheral circuit register according to the embodiment. As described previously, the data memory 3 is the target of only the individual access, and the registers of the peripheral circuits 4A and 4B are the target of only the shared access. There is shown an example in which in the data memory 3, there are four regions of data memory address 0, data memory address 1, data memory address 2, and data memory address 3 and in the peripheral circuits 4A and 4B, there are four registers of peripheral circuit register A, peripheral circuit register B, peripheral circuit register C, and peripheral circuit register D. For example, addresses are allocated as follows. B100000 to B100011 are allocated to the address region on which the individual access is performed (individual access region) and B100100 to B100111 are allocated to the address region on which the shared access is performed (shared access region). Here, B is an abbreviation of Binary and means that the following numerical values are binary numbers. In order to simplify explanation, it is assumed that the address is expressed by a binary number of six bits, but actually, the address space is a wide address space such as a 32-bit, 48-bit, or 64-bit address space. The width of data to be stored in each address is 8 bits (1 byte). For example, in the data memory address 0, data having a length of 8 bits is stored.

Moreover, there are separated B100000 to B100001 of the address regions of the data memory 3 for performing the individual access by executing the first thread TH1 and B100010 to B100011 of the address regions of the data memory 3 for performing the individual access by executing the second thread TH2. In this case, the data written by the shared access is not overwritten by the individual access and the data written by the individual access is not overwritten by the shared access, and thus the development of the program becomes easy. However, the memory region that can be used for the individual access and the shared access is reduced.

(Modification 3)

Figure 18:
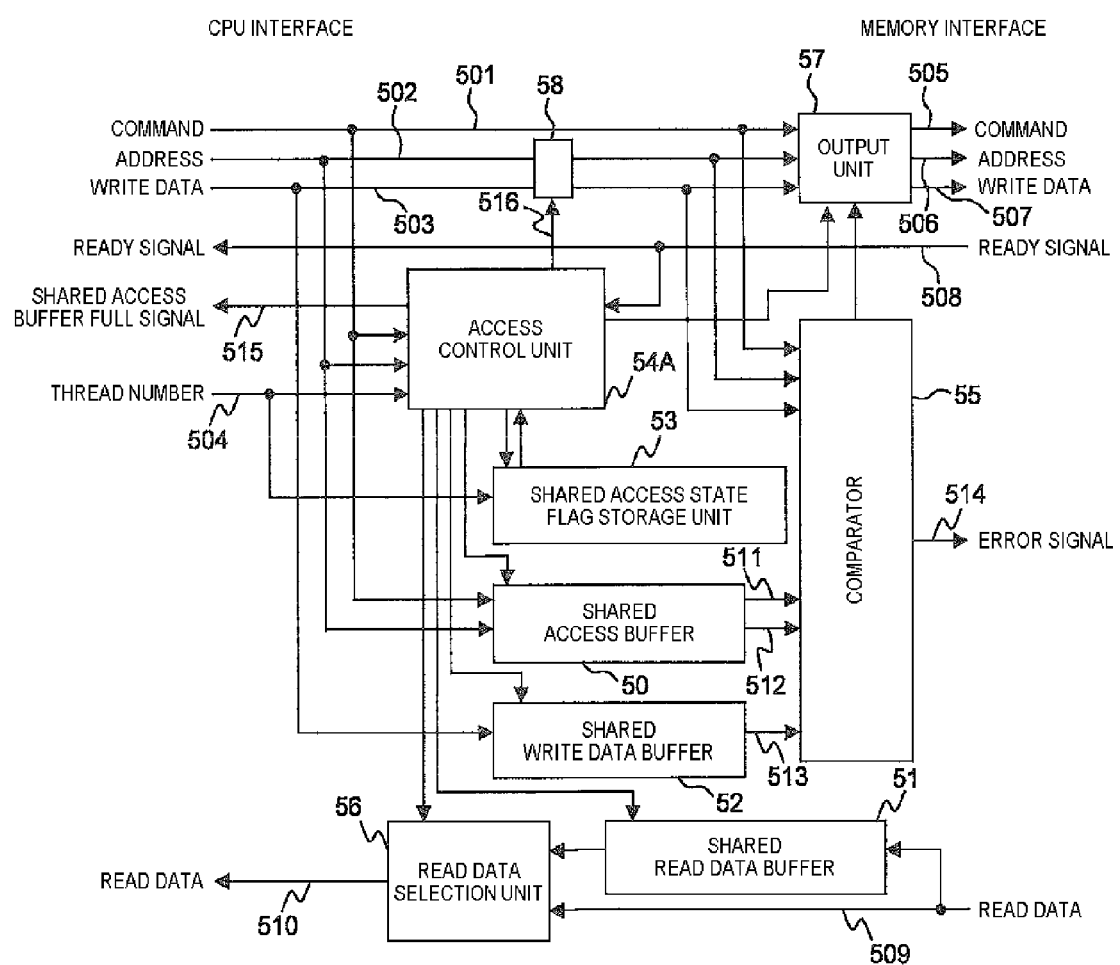
FIG. 18 is a block diagram of the data access control circuit according to the Modification 3 of the embodiment.

FIG. 18 is a block diagram of a data access control circuit according to a Modification 3. To a data access control circuit 5A, a conversion circuit 58 configured to convert a logical address input from the CPU into a physical address and a signal line 516 are added in comparison with the data access control circuit 5 according to the embodiment in FIGS. 8A and 8B. Along with that, the access control unit 54 is replaced with an access control unit 54A. Other than the above, the same applies to the data access control circuit 5 in FIGS. 8A and 8B, and thus, duplicated explanation is omitted.

Figure 10:
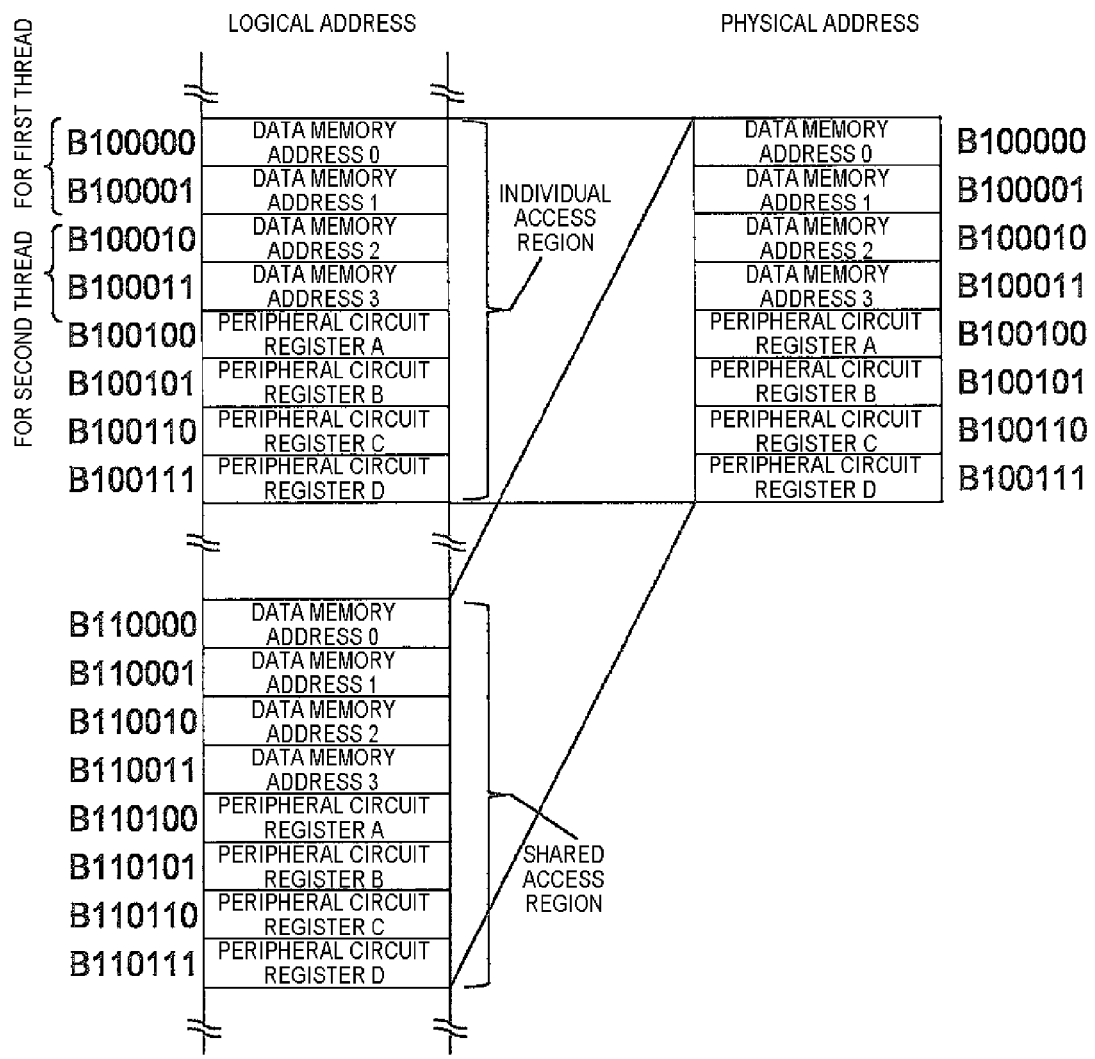
FIG. 10 is a diagram showing a relationship between logical addresses and physical addresses of a data memory and a peripheral circuit register according to a Modification 3 of the embodiment.

FIG. 10 is a diagram showing a relationship between the logical address and the physical address of the data memory and the peripheral circuit register according to the Modification 3 of the embodiment. In the Modification 3, the data memory 3 and the registers of the peripheral circuits 4A and 4B are the target of the individual access and also the target of the shared access. The Modification 3 differs from the embodiment in which the data memory 3 is the target of only the individual access and the registers of the peripheral circuits 4A and 4B are the target of only the shared access. Consequently, there exists no longer a problem in which the memory region that can be used for the individual access and the shared access is reduced, like in the embodiment. There is shown an example in which, in the data memory 3, there are four regions of data memory address 0, data memory address 1, data memory address 2 and data memory address 3, and in the peripheral circuits 4A and 4B, there are four registers of peripheral circuit register A, peripheral circuit register B, peripheral circuit register C and peripheral circuit register D. The logical address is an address viewed from the CPU. B100000 to B100111 are allocated to the address region on which the individual access is performed and B110000 to B110111 are allocated to the address region on which the shared access is performed. The physical address is an address viewed from the data memory 3 and the registers of the peripheral circuits 4A and 4B. This is an example in which the address regions are assumed to be B100000 to B100111.

In the case where the addresses the CPU outputs are B100000 to B100111, the individual access is executed and in the case of B110000 to B110111, the shared access is executed. It is possible to easily determine that the access is the individual access if the high-order three bits are "100", and the access is the shared access if "110". B100000 to B100011 of the address regions on which the individual access is performed correspond to the address regions of the data memory 3 and B100100 to B100111 of the address regions on which the individual access is performed correspond to the address regions of the registers of the peripheral circuits 4A and 4B. B110000 to B110011 of the address regions on which the shared access is performed correspond to the address regions of the data memory 3 and B110100 to B110111 of the address regions on which the shared access is performed correspond to the address regions of the registers of the peripheral circuits 4A and 4B.

Furthermore, there are separated B100000 to B100001 of the address regions of the data memory 3 for performing the individual access by executing the first thread TH1 and B100010 to B100011 of the data memory 3 for performing the individual access by executing the second thread TH2. By separating the regions as above, it is possible to prevent the written data from being deleted by the execution of the different threads (situation in which the second thread TH2 is executed after the first thread TH1 is executed and the data written by the execution of the first thread TH1 is deleted).

Even in the case of the individual access, those corresponding to the address regions of the registers of the peripheral circuits 4A and 4B are not separated among the different threads. The reason is because each register is configured to control the peripheral circuits 4A and 4B, and thus if separated, there is caused a trouble in which the peripheral circuits 4A or 4B exist without being controlled each time the individual threads are executed. However, accesses corresponding to the address regions of the registers of the peripheral circuits 4A and 4B are not separated between the different threads even in the case of the individual access, and thus there is a problem as below. It gives rise to the problem that the data written in the registers of the peripheral circuits 4A and 4B on the basis of the execution result of the first thread TH1 is overwritten in the registers of the peripheral circuits 4A and 4B on the basis of the execution result of the second thread TH2. Therefore, in order to avoid such a problem, the individual access to the address regions of the registers of the peripheral circuits 4A and 4B may be prohibited. If the logical address space for the individual access of the registers of the peripheral circuits 4A and 4B is not originally provided, it becomes possible to prohibit the individual access.

While the address regions of the data memory 3 for performing the individual access are separated into the regions for the first thread TH1 and the regions for the second thread TH2, the address regions for performing the shared access are not separated between the first thread TH1 and the second thread TH2. The reason is because there are compared the write of the shared access, the command, the address, and the write data generated when the first thread TH1 is executed, and the command, the address, and the write data generated when the second thread TH2 is executed, respectively, and when they agree, the write data is updated. Because of this, the situation in which the written data is deleted by the execution of the different thread does not originally occur.

The operation of the data access control circuit 5A different from that of the data access control circuit 5 will be explained below. The access control unit 54A outputs control signals as follows to the signal line 516 in accordance with the command and the address. In the case where the high-order three bits of the logical address are "100", the conversion circuit 58 outputs the address as it is by the control signal from the signal line 516. In the case where the high-order bits of the address are "110", the conversion circuit 58 outputs the high-order three bits of the address after replacing them with "100", by the control signal from the signal line 516. The operation of the access control circuit 54A other than the above is the same as that of the access control circuit 54, and thus duplicated explanation is omitted. It may also be possible to arrange the conversion circuit 58 in the output unit 57 instead of arranging it before the output unit 57 as in FIG. 18.

It is possible to apply the data access control circuit 5A according to the Modification 3 to the microcontroller of the embodiment, the Modification 1, and the Modification 2.

A summary of the above-mentioned Modification 3 has a configuration in which the target of the data access has two logical addresses for any physical address, and the access can be performed by any of the individual access and the shared access. Because of this, both the individual access and the shared access become possible for the same physical address of the memory.

(Modification 4)

Figure 12:
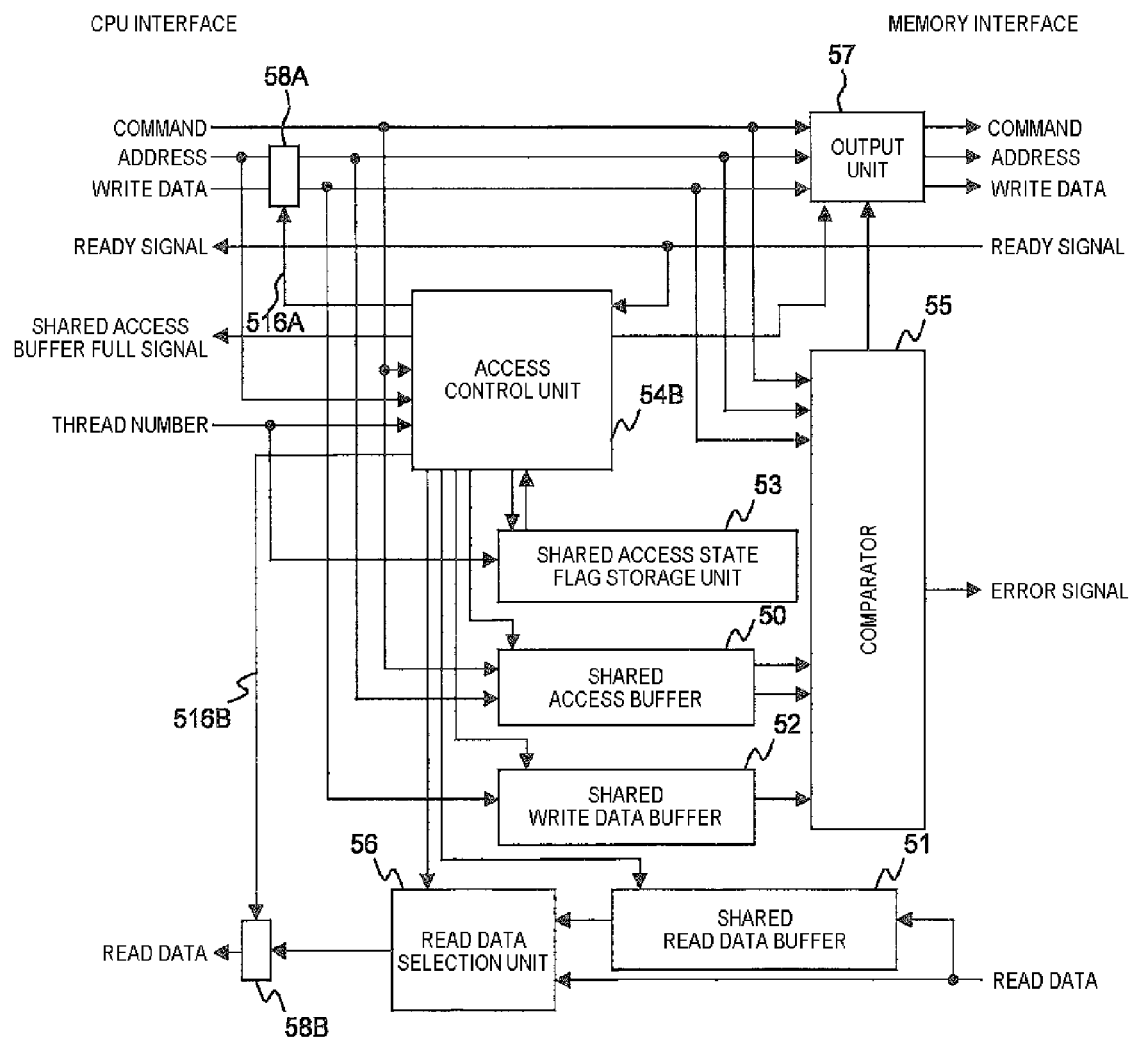
FIG. 12 is a block diagram of a data access control circuit according to the Modification 4 of the embodiment.

FIG. 12 is a block diagram of a data access control circuit according to a Modification 4. In a data access control circuit 5B, conversion circuits 58A and 58B and signal lines 516A and 516B are added to the data access control circuit 5 in FIGS. 8A and 8B. Along with that, the access control unit 54 is replaced with the access control unit 54B. Other than the above, the same applies to the data access control circuit 5 in FIGS. 8A and 8B, and thus duplicated explanation is omitted.

Figure 11:
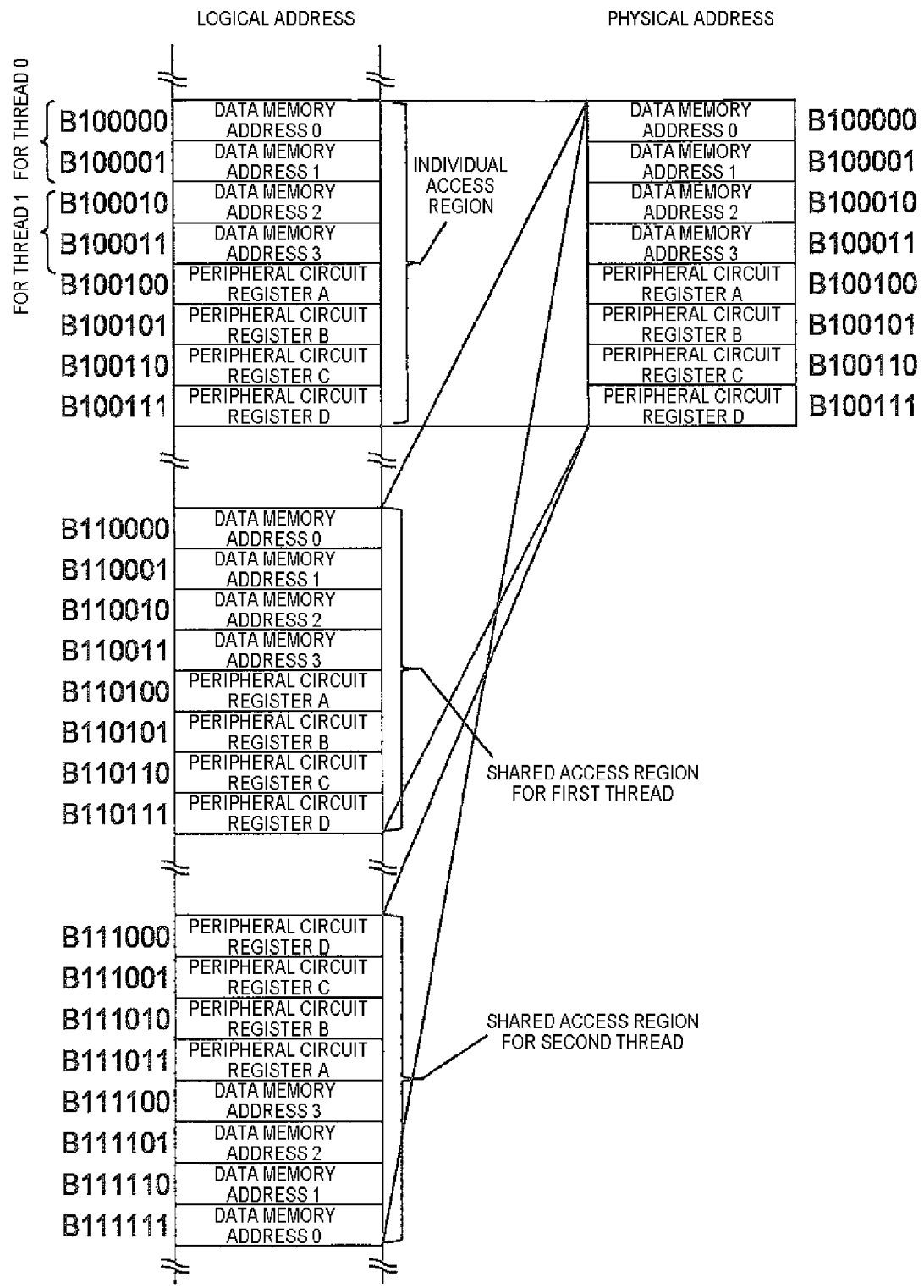
FIG. 11 is a diagram showing a relationship between logical addresses and physical addresses of a data memory and a peripheral circuit register according to a Modification 4 of the embodiment.

FIG. 11 is a diagram showing a relationship between the logical address and the physical address of the data memory and the peripheral circuit register according to the Modification 4. In the Modification 4 also, the data memory 3 and the registers of the peripheral circuits 4A and 4B are the target of the individual access and are also the target of the shared access. To the Modification 3 in FIG. 10, regions of B111000 to B111111 of the logical addresses are added. Data memory address 0, data memory address 1, data memory address 2, and data memory address 3, and peripheral circuit register A, peripheral circuit register B, peripheral circuit register C, and peripheral circuit register D in the added regions are in the opposite order of the data memories and the peripheral circuit registers in the individual region B100000 to B100111 and the shared region B110000 to B110111. For example, in the case where the first thread TH1 performs the shared access, B110000 to B110111 of the logical address region are used and in the case where the second thread TH2 performs the shared access, B111000 to B111111 of the logical address region are used. Furthermore, it is also possible to cause the data of the logical address region of B111000 to B111111 to have the negative logic. By doing so, in the case where the same data memory or the same peripheral circuit register is accessed, the address calculation and the data calculation are different between the first thread TH1 and the second thread TH2, and thus it becomes easier to discover a failure in the circuit used in common such as the operation circuit, even in the case where the single core CPU is used. It is possible to easily perform conversion from the added shared region of the logical address to the physical address and data conversion. Furthermore, as in the Modification 3, there are separated B100000 to B100001 of the address region of the data memory 3 on which the individual access is performed by executing the first thread TH1 and B100010 to B100011 of the address region of the data memory 3 on which the individual access is performed by executing the second thread TH2.

The operation of the data access control circuit 5B different from that of the data access control circuit 5 will be explained below. The access control unit 54B outputs control signals to the signal lines 516A and 516B in accordance with the command and the address and performs control as follows.

(1) In the Case Where the High-order Three Bits of the Logical Address are "100"

In the case of the write access, the conversion circuit 58A outputs the address and the write data as they are by the control signal from the signal line 516A. In the case of the read access, the conversion circuit 58B outputs the input as it is by the control signal from the signal line 516B.

(2) In the Case Where the High-order Bits of the Address are "110"

In the case of the write access, the conversion circuit 58A outputs the high-order three bits of the address after replacing them with "100" and outputs the write data as it is, by the control signal from the signal line 516A. In the case of the read access, the conversion circuit 58B outputs the input as it is by the control signal from the signal line 516B.

(3) In the Case Where the High-order Bits of the Address are "111"

In the case of the write access, the conversion circuit 58A outputs the high-order three bits of the address after replacing them with "100" and outputs the write data after reversing the logic, by the control signal from the signal line 516A. In the case of the read access, the conversion circuit 58B outputs the input after reversing the logic by the control signal from the signal line 516B.

The operation of the access control circuit 54B other than the above is the same as that of the access control circuit 54, and thus duplicated explanation is omitted.

It is possible to apply the data access control circuit 5B according to the Modification 4 to the microcontroller of the embodiment, the Modification 1, and the Modification 2.

The above Modification 4 will be summarized as follows.

(1) The target of the data access has at least three logical addresses for any physical address and can be accessed by either the individual access by at least one logical address or the shared access by at least two logical addresses, and the two logical addresses by which the shared access is performed serve as the data access in which a part of the address field is logically reversed. It is possible to access the shared memory by two different logical addresses, and thus the access is performed using a different logical address for each of the threads to be subjected to duplexing processing, and it becomes possible to exclude the same failure of the address.

(2) The data of the two logical addresses by which the shared access is performed is logically reversed. Consequently, the shared memory is accessed by two pieces of data in the exclusive relationship, and thus it becomes possible to exclude the same failure of the data.

(Modification 5)

Figure 13:
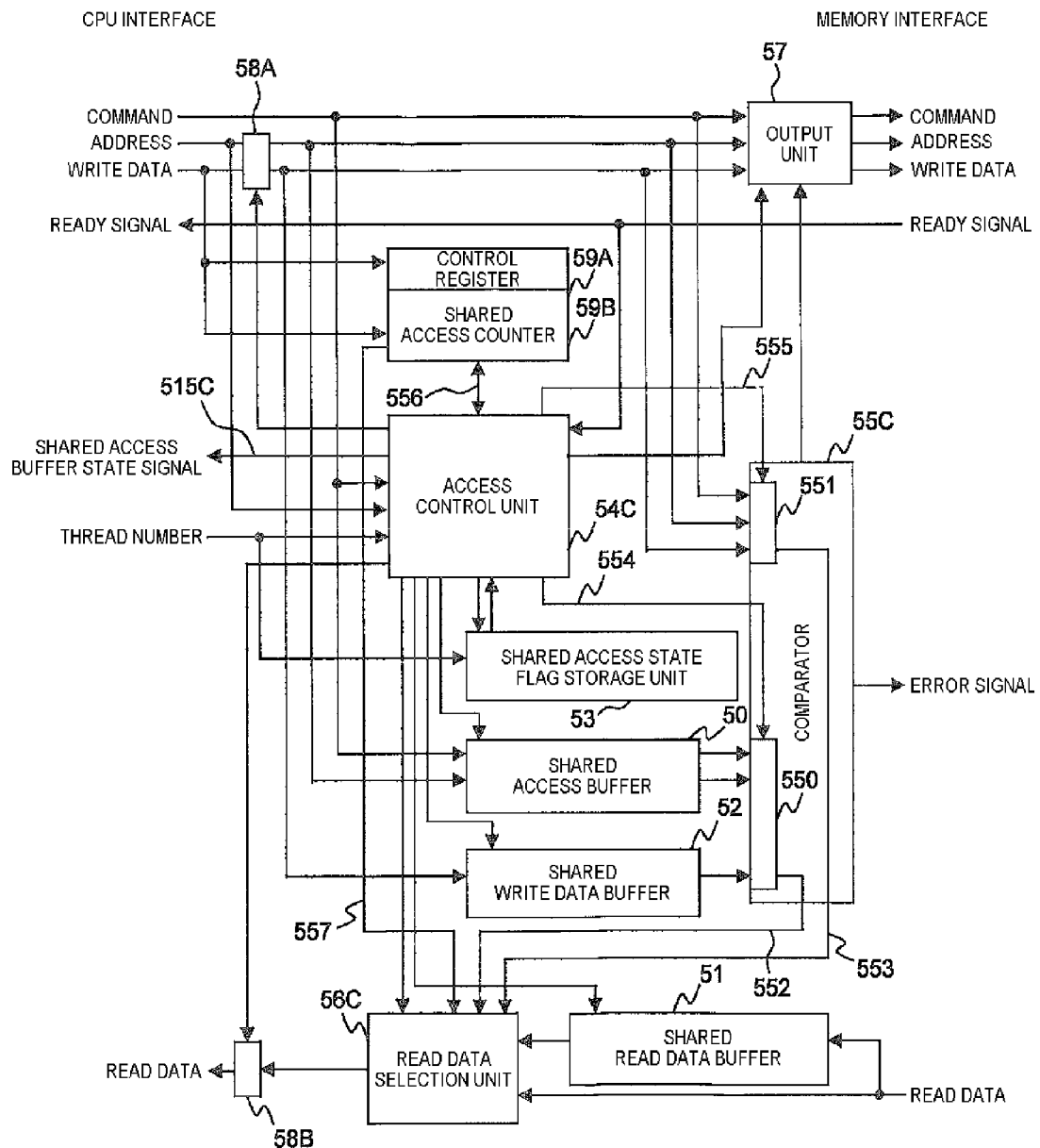
FIG. 13 is a block diagram of a data access control circuit according to a Modification 5 of the embodiment.

FIG. 13 is a block diagram of a data access control circuit according to a Modification 5. In comparison with the data access control circuit 5B according to the Modification 4 in FIG. 12, in a data access control circuit 5C, shared access registers 550 and 551 are added to the comparator 55 and a control register 59A and a shared access counter 59B are added. Furthermore, it becomes possible to select, by the read data selection unit 56, the shared access registers 550 and 551 and the shared access counter 59B, to thereby read them into the CPU. Along with this, signal lines 552, 553, 554, 555, and 556 are added and the access control unit 54 is replaced with an access control unit 54C, the read data selection unit 56 is replaced with a read data selection unit 56C, and the signal line 515 is replaced with a signal line 515C. Other than the above, the same applies to the data access control circuit 5B in FIG. 12, and thus duplicated explanation is omitted. Here, the relationship between the logical address and the physical address is the same as that in FIG. 11.

When the access of the latter thread of the shared access is executed, the command and the address registered in the shared access buffer 50 and the write data registered in the shared write data buffer 52 are stored in the shared access register 550 by the control signal of the signal line 554. In addition, the command, the address, and the write data of the access being executed are stored in the shared access register 551 by the control signal of the signal line 555. It is possible to read the shared access registers 550 and 551, via the signal lines 552 and 553 and the read data selection unit 56C, by the CPU specifying the addresses.

The control register 59A sets whether or not to execute the write access to data memory 3 or the peripheral circuit registers 4A and 4B in the case where the write access of the latter thread of the shared access is executed. In the case of setting the execution, when the write access of the latter thread of the shared access is performed, the command and the address stored in the shared access buffer 50 and the write data stored in the shared write data buffer 52, and the command, the address, and the write data of the access being performed are compared, respectively, by a comparator 55C. In the case where the comparison results agree, the command, the address, and the write data are output from the output unit 57 and the write access is performed.

The shared access buffer state signal output from the access control unit 54C to the CPU via the signal line 515C includes the shared access buffer full signal and the shared access buffer effective signal. The shared access buffer full signal is a signal indicating that there is no region in which a command or address can be stored in the shared access buffer 50. The shared access buffer effective signal is a signal indicating that a command or address is stored in the shared access buffer 50 and in the case where at least one command or address is stored, the signal indicates the effective state.

Interrupt requests that the CPU receives include an interrupt from an external terminal of the microcontroller, an interrupt indicating the completion of A/D conversion, an interrupt from a timer and the like. Each interrupt request has an attribute indicating whether or not the shared access is included. The CPU recognizes whether or not the shared access state flag 530 is in the registered state by receiving the shared access buffer effective signal of the shared access buffer state signal. In the case where it is determined that the shared access state flag 530 is in the registered state, the CPU is caused to perform control so as not to receive an interrupt request including the shared access. By doing so, even if the shared access is generated in the interrupt processing routine, it is possible to cause the order and the contents of the shared access performed between two threads to agree each other. It may also be possible to configure the access control unit 54 of the data access control circuit 5 in FIGS. 8A and 8B, the access control unit 54A of the data access control circuit 5A in FIG. 18, and the access control unit 54B of the data access control circuit 5B in FIG. 12 so as to output the shared access buffer effective signal.

The shared access counter 59B can be read and written by the CPU, and the value is incremented by one when the registration to the shared access buffer 50 is performed. The CPU can check whether the shared access is performed correctly by reading the shared access counter 59B via a signal line 557 and the read data selection unit 56C.

It is possible to apply the data access control circuit 5C according to the Modification 5 to the microcontroller of the embodiment, the Modification 1, and the Modification 2.

The above Modification 5 will be summarized as follows.

(1) The Modification 5 has the shared access registers 550 and 551 which are configured to store the command, the address, and the write data registered in the buffer (the shared access buffer 50, the shared write data buffer 52) by the former access and the access data by the latter access when the latter write access of the shared access is performed, and which are capable of being read from the CPU. Due to the shared access registers 550 and 551, it becomes possible for the CPU to inspect the shared access data by the two threads.

(2) In the case where the latter access of the shared access is performed, it is possible to set whether or not to execute the write access by inputting a value to the control register 59A by the CPU. Due to this, it becomes possible for the CPU to inspect the shared access data by the two threads and to perform the final access in addition to automatically executing the shared access.

(3) In the case where the CPU determines that the shared access state flag 530 is in the registered state, it is made possible for the CPU not to accept interrupt request including the shared access. Due to this, it is possible to prevent the information registered in the shared access buffer 50 by the shared access performed in the interrupt processing routine, from being overwritten and to prevent an inappropriate operation by the information overwritten when the original program is returned from the interrupt processing routine, from being caused.

(4) The Modification 5 has the counter that can be read and written by the CPU and whose value is incremented by one when the registration to the shared access buffer 50 is performed. It is possible for the CPU to check whether the shared access is performed correctly.

Hereinabove, although the invention made by the present inventors has been specifically explained on the basis of the embodiments and examples, it is needless to say that the present invention is not limited to the embodiments and examples and can be modified variously.

What is claimed is:
1. A microcontroller comprising:
   a CPU;
   a command memory coupled to the CPU and configured to store commands to be processed by the CPU;
   a data memory configured to store data to be processed by the CPU;
   a peripheral circuit which incorporates a peripheral circuit register, which is configured to perform predetermined processing by the writing of the CPU to the peripheral circuit register, and which is configured to store processing results in the peripheral circuit register, data of the peripheral circuit register being capable of being read by the CPU; and
   a data access control circuit coupled between the CPU and the data memory and between the CPU and the peripheral circuit and configured to perform access control from the CPU to the data memory or to the peripheral circuit register,
   wherein the command memory is caused to store two threads,
   wherein the CPU executes the two threads to thereby perform duplexing processing,
   wherein a first address indicates a storage region of the data memory and the peripheral circuit register,
   wherein the data access control circuit generates an individual access from the CPU to the data memory or to the peripheral circuit register, by execution processing of the two threads, respectively,
   wherein the data access control circuit generates a shared access based on the execution processing of the two threads, from the CPU to the data memory or to the peripheral circuit register, and
   wherein the data access control circuit determines two types of the individual access and the shared access by the first addresses output from the CPU based on the execution processing of the two threads, respectively, and the duplexing processing to detect a failure of the CPU is performed by making a comparison between the commands and the first addresses, respectively, in the shared access based on the result of the execution processing of the two threads.

2. The microcontroller according to claim 1,
   wherein the shared access includes a first read access, a second read access performed after the first read access, a first write access, and a second write access performed after the first write access,
   wherein in the first read access, the CPU reads first read data read by accessing the data memory or the peripheral circuit register,
   wherein in the second read access, the CPU reads first read data read by the first read access,
   wherein in the first write access, a first write command, a first write address, and first write data, by the first write access are stored in the data access control circuit, and
   wherein in the second write access, each of a second write command, a second write address, and second write data, by the second write access and each of the first write command, the first write address, and the first write data, by the first write access are compared, and a write access is performed to the data memory or the peripheral circuit register in the case where they agree.

3. The microcontroller according to claim 2,
   wherein the data access control circuit includes:
      a shared access buffer configured to register the command and the first address of the shared access generated by the thread earlier executed of the shared access based on the execution of the two threads;
      a shared read data buffer configured to register the first read data in the case where the first read access is generated;
      a shared write data buffer configured to register the first write data in the case where the first write access is generated; and
      a shared access state flag storage unit configured to register an unregistered state in the case where the command and the address are not registered in the shared access buffer and configured to register a shared access state flag indicating the number of the thread that has performed the access on the shared access buffer in the case where registered, wherein in the case where the shared access is generated, when the unregistered state is indicated, it is determined that the shared access is the first read access or the first write access, which is the access earlier executed, and there are registered the shared access buffer, the shared access state flag, the shared read data buffer or the shared write data buffer, wherein in the case where the shared access is generated, when the shared access state flag is registered in the shared access state flag storage unit and the thread number indicated by the shared access state flag and the thread number of the shared access are different, it is determined that the shared access is the second read access or the second write access, which is the access later executed, and the command and the address of the access later executed and the command and the first address registered in the shared access buffer are compared, and in the case where the access later executed is the second read access, the CPU is caused to read data from the shared read data buffer, and in the case where the access later executed is the second write access, the write data of the second write access is further compared with the first write data registered in the shared write data buffer, and if all of the command, the address, and the write data agree, the write access to the data memory or the peripheral circuit register is performed, and when the processing of the second read access or the second write access is completed, the shared access buffer, the shared read data buffer, or the shared write data buffer is released, and when there are no longer entries in the shared read data buffer or the shared write data buffer, the shared access state flag is set to the unregistered state, and wherein in the case where the shared access is generated, when the shared access state flag is registered in the shared access state flag storage unit and the thread number indicated by the shared access state flag and the thread number of the shared access are the same, it is determined that the shared access is a shared access generated after the shared access, and registration is performed in the case where there is a storable region in the shared access buffer, the shared read data buffer, or the shared write data buffer, and in the case where there is no storage region, a shared access buffer full signal indicating that the shared access buffer is full is output to the CPU.

4. The microcontroller according to claim 3,
wherein in the case where the CPU is a single core CPU, when the shared access buffer full signal is output, the CPU cancels the shared data access.

5. The microcontroller according to claim 3,
wherein in the case where the CPU is a multicore CPU, when the shared access buffer full signal is output, the CPU stalls the shared access and the data access control circuit performs data access of the other core in a preferential manner.

6. The microcontroller according to claim 3,
wherein in the case where the CPU is a CPU having a hardware multithread function, if the shared access buffer full signal is output, the CPU skips the shared data access and executes data access of the other thread in a preferential manner, and if the shared access buffer full signal is not output when the execution order comes to the skipped thread, the CPU executes data access and if output, the CPU skips data access.

7. The microcontroller according to claim 3,
wherein the microcontroller includes a register which is configured to store data of the shared access buffer and the shared write buffer, and access data by the latter access when the latter write access of the shared access is executed, and which is capable of being read from the CPU.

8. The microcontroller according to claim 7,
wherein in the case where the latter write access of the shared access is executed, it is possible to set whether or not to execute write access to the data memory or the peripheral circuit register.

9. The microcontroller according to claim 3,
wherein in the case where the shared access buffer is in the registered state, the CPU does not receive an interrupt request including a command to execute the shared access.

10. The microcontroller according to claim 3,
wherein the microcontroller includes a counter which is capable of being read and written by the CPU, and which increments its value by one when registration to the shared access buffer is performed.

11. The microcontroller according to claim 1,
wherein the data memory and the peripheral circuit register have two logical addresses for any physical address and can be accessed by any of the individual access and the shared access.

12. The microcontroller according to claim 1,
wherein the data memory and the peripheral circuit register have at least three logical addresses for any physical address and can be accessed by any one of the individual access by at least one logical address and the shared access by at least two logical addresses, and
wherein in the two logical addresses by which the shared access is performed, a part of the address field is logically reversed.

13. The microcontroller according to claim 12,
wherein the data of the two logical addresses by which the shared access is performed is logically reversed.

14. A semiconductor integrated circuit device comprising:
a CPU configured to perform processing to execute two threads;
a data memory configured to store data processed by the CPU;
a peripheral circuit which incorporates a register and which is controlled by data of the register; and
a data access control circuit coupled between the CPU and the data memory and between the CPU and the peripheral circuit and configured to perform access control from the CPU to the data memory or the register,
wherein a first address indicates a storage region of the data memory and the register,
wherein the data access control circuit generates an individual access from the CPU to the data memory or to the register by processing to execute the two threads, respectively,
wherein the data access control circuit generates a shared access from the CPU to the data memory or to the register based on the processing to execute the two threads, and
wherein the data access control circuit detects a failure of the CPU by making a comparison between the command and the first address, respectively, in the shared access based on the result of the processing to execute the two threads.

15. The semiconductor integrated circuit device according to claim 14,
   wherein the data access control circuit determines two types of accesses of the individual access and the shared access, by the first addresses output from the CPU based on the processing to execute the two threads, respectively.

16. The semiconductor integrated circuit device according to claim 15,
   wherein an address space where it is possible to perform the individual access to the data memory generated by performing processing to execute one of the two threads, and an address space where it is possible to perform the individual access to the data memory generated by performing processing to execute the other of the two threads are separated.

17. A semiconductor integrated circuit device comprising:
   a CPU;
   a data access control circuit; and
   a data storage unit,
   wherein the CPU is caused to execute two threads sequentially in order to detect a failure,
   wherein the data access control circuit controls data access to the data storage unit of the CPU, and
   wherein the data storage unit has an individual access region corresponding to each of the two threads and a common access region common to the two threads,
   wherein the data access control circuit generates an individual access based on processing to execute the thread, from the CPU to the individual access region of the data storage unit, and a shared access based on processing to execute the two threads, to the common access region, and
   wherein the data access control circuit makes a comparison between the command and the address, respectively, in the shared access based on the result of the processing to execute the two threads.

18. A semiconductor integrated circuit device comprising:
   a CPU;
   a data access control circuit; and
   a data storage unit,
   wherein the CPU is caused to execute two threads sequentially in order to detect a failure,
   wherein the data access control circuit controls data access to the data storage unit of the CPU, and
   wherein the data storage unit has an individual access region corresponding to each of the two threads and a common access region common to the two threads,
   wherein the data access control circuit generates an individual access based on processing to execute the thread, from the CPU to the individual access region of the data storage unit, and a shared access based on processing to execute the two threads, to the common access region, and
   wherein the data access control circuit makes a comparison among the command, the address and the write data, respectively, in the shared access based on the result of the processing to execute the two threads.

\* \* \* \* \*